US010817875B2

(12) United States Patent
Makhotin et al.

(10) Patent No.: US 10,817,875 B2
(45) Date of Patent: Oct. 27, 2020

(54) SECURE REMOTE PAYMENT TRANSACTION PROCESSING INCLUDING CONSUMER AUTHENTICATION

(71) Applicant: Visa International Service Association, San Francisco, CA (US)

(72) Inventors: Oleg Makhotin, Castro Valley, CA (US); Kiushan Pirzadeh, Foster City, CA (US)

(73) Assignee: Visa International Service Association, San Francisco, CA (US)

(*) Notice: Subject to any disclaimer, the term of this patent is extended or adjusted under 35 U.S.C. 154(b) by 446 days.

(21) Appl. No.: 14/493,247

(22) Filed: Sep. 22, 2014

(65) Prior Publication Data

US 2015/0088756 A1  Mar. 26, 2015

Related U.S. Application Data

(60) Provisional application No. 61/880,802, filed on Sep. 20, 2013.

(51) Int. Cl.
*G06Q 20/38* (2012.01)
*G06Q 20/32* (2012.01)
(Continued)

(52) U.S. Cl.
CPC ......... *G06Q 20/3829* (2013.01); *G06Q 20/12* (2013.01); *G06Q 20/32* (2013.01);
(Continued)

(58) Field of Classification Search
CPC ................................................ G06Q 20/3821
(Continued)

(56) References Cited

U.S. PATENT DOCUMENTS 5,878,138 A    3/1999  Yacobi
5,987,132 A   11/1999  Rowney
(Continued)

FOREIGN PATENT DOCUMENTS

CN    1394408 A    1/2003
CN    1842813 A   10/2006
(Continued)

OTHER PUBLICATIONS

International Search Report and Written Opinion of the International Searching Authority dated Jan. 9, 2015 for PCT Patent Application No. PCT/US2014/056837, 9 pages.
(Continued)

*Primary Examiner* — Chinedu C Agwumezie
(74) *Attorney, Agent, or Firm* — Kilpatrick Townsend & Stockton LLP

(57) ABSTRACT

Embodiments of the invention are directed to methods, apparatuses, computer-readable media, and systems for securely processing remote transactions. One embodiment is directed to a method of processing a remote transaction initiated by a communication device. The method comprising a server computer receiving a payment request including encrypted payment information that is encrypted using a first key. The encrypted payment information including security information. The method further comprises decrypting the encrypted payment information using a second key, obtaining an authentication response value for the remote transaction from an authentication computer associated with an issuer, updating the decrypted payment information to include the authentication response value, re-encrypting the decrypted payment information using a third key, and sending a payment response including the re-encrypted payment information to a transaction processor. The transaction processor decrypting the re-encrypted payment information
(Continued)

using a fourth key and initiating a payment transaction using the decrypted payment information.

17 Claims, 7 Drawing Sheets

(51) Int. Cl.
  *G06Q 20/12* (2012.01)
  *G06Q 20/40* (2012.01)
(52) U.S. Cl.
  CPC ....... *G06Q 20/382* (2013.01); *G06Q 20/3823* (2013.01); *G06Q 20/401* (2013.01)
(58) Field of Classification Search
  USPC .................................................. 705/71, 75
  See application file for complete search history.

(56) References Cited

U.S. PATENT DOCUMENTS

| | | | |
|---|---|---|---|
| 6,192,473 B1 * | 2/2001 | Ryan, Jr. | G06F 21/445 380/277 |
| 6,230,272 B1 * | 5/2001 | Lockhart | G06F 21/62 726/2 |
| 6,286,099 B1 | 9/2001 | Kramer | |
| 6,931,382 B2 | 8/2005 | Laage et al. | |
| 7,096,354 B2 | 8/2006 | Wheeler et al. | |
| 7,353,382 B2 | 4/2008 | Labrou et al. | |
| 7,801,826 B2 | 9/2010 | Labrou et al. | |
| 7,849,020 B2 | 12/2010 | Johnson | |
| 8,121,942 B2 | 2/2012 | Carlson et al. | |
| 8,121,956 B2 | 2/2012 | Carlson et al. | |
| 8,224,702 B2 | 7/2012 | Mengerink et al. | |
| 8,280,777 B2 | 10/2012 | Mengerink et al. | |
| 8,313,022 B2 * | 11/2012 | Hammad | G06F 21/34 235/380 |
| 8,417,642 B2 | 4/2013 | Oren | |
| 8,498,908 B2 | 7/2013 | Mengerink et al. | |
| 8,538,845 B2 | 9/2013 | Liberty | |
| 8,583,494 B2 | 11/2013 | Fisher | |
| 8,589,291 B2 | 11/2013 | Carlson et al. | |
| 8,589,691 B1 | 11/2013 | Hackborn et al. | |
| 8,601,266 B2 | 12/2013 | Aabye et al. | |
| 8,606,638 B2 | 12/2013 | Dragt | |
| 8,606,700 B2 | 12/2013 | Carlson et al. | |
| 8,606,720 B1 | 12/2013 | Baker et al. | |
| 8,620,754 B2 | 12/2013 | Fisher | |
| 8,635,157 B2 | 1/2014 | Smith et al. | |
| 8,646,059 B1 | 2/2014 | von Behren et al. | |
| 8,898,089 B2 * | 11/2014 | Faith | G06Q 20/32 705/75 |
| 9,154,477 B2 | 10/2015 | Cambridge et al. | |
| 9,294,468 B1 | 3/2016 | Kilbourn | |
| 2004/0059686 A1 | 3/2004 | Levesque | |
| 2004/0250074 A1 | 12/2004 | Kilian-Kehr | |
| 2005/0222961 A1 | 10/2005 | Staib et al. | |
| 2006/0133615 A1 | 6/2006 | Bade et al. | |
| 2006/0167812 A1 | 7/2006 | Bhambri et al. | |
| 2006/0235795 A1 | 10/2006 | Johnson | |
| 2006/0271496 A1 | 11/2006 | Balasubramanian et al. | |
| 2007/0022301 A1 | 1/2007 | Nicholson et al. | |
| 2009/0106160 A1 | 4/2009 | Skowronek | |
| 2009/0112747 A1 | 4/2009 | Mullen et al. | |
| 2009/0307140 A1 | 12/2009 | Mardikar | |
| 2010/0082481 A1 | 4/2010 | Lin et al. | |
| 2010/0088518 A1 | 4/2010 | Dottax et al. | |
| 2010/0169659 A1 | 7/2010 | Shnowske et al. | |
| 2010/0211507 A1 | 8/2010 | Aabye et al. | |
| 2010/0217709 A1 | 8/2010 | Aabye et al. | |
| 2010/0250442 A1 | 9/2010 | Coppinger | |
| 2010/0306076 A1 | 12/2010 | Taveau et al. | |
| 2011/0016320 A1 | 1/2011 | Bergsten et al. | |
| 2011/0131102 A1 | 6/2011 | Wang et al. | |
| 2011/0137802 A1 * | 6/2011 | Spies | G06Q 20/3823 705/65 |
| 2011/0201306 A1 | 8/2011 | Ali Al-Harbi | |
| 2011/0231648 A1 | 9/2011 | Robertson et al. | |
| 2011/0295753 A1 | 12/2011 | Reno | |
| 2012/0072350 A1 | 3/2012 | Goldthwaite et al. | |
| 2012/0123882 A1 | 5/2012 | Carlson et al. | |
| 2012/0143767 A1 | 6/2012 | Abadir | |
| 2012/0143772 A1 | 6/2012 | Abadir | |
| 2012/0158580 A1 | 6/2012 | Crisan | |
| 2012/0203664 A1 | 8/2012 | Torossian et al. | |
| 2012/0203666 A1 | 8/2012 | Torossian et al. | |
| 2012/0233004 A1 | 9/2012 | Bercaw | |
| 2012/0233685 A1 | 9/2012 | Palanigounder et al. | |
| 2012/0265688 A1 | 10/2012 | Dinan | |
| 2012/0300932 A1 | 11/2012 | Cambridge | |
| 2012/0303503 A1 | 11/2012 | Cambridge et al. | |
| 2012/0303961 A1 | 11/2012 | Kean et al. | |
| 2013/0007849 A1 | 1/2013 | Coulter et al. | |
| 2013/0019098 A1 | 1/2013 | Gupta et al. | |
| 2013/0041831 A1 | 2/2013 | Das | |
| 2013/0054473 A1 | 2/2013 | Jan et al. | |
| 2013/0060706 A1 | 3/2013 | Aabye et al. | |
| 2013/0066788 A1 | 3/2013 | Goodrich et al. | |
| 2013/0080276 A1 | 3/2013 | Granbery | |
| 2013/0110717 A1 | 5/2013 | Kobres | |
| 2013/0117185 A1 | 5/2013 | Collison | |
| 2013/0124290 A1 | 5/2013 | Fisher | |
| 2013/0124291 A1 | 5/2013 | Fisher | |
| 2013/0124364 A1 | 5/2013 | Mittal | |
| 2013/0124421 A1 | 5/2013 | Deng | |
| 2013/0138525 A1 | 5/2013 | Bercaw | |
| 2013/0151405 A1 | 6/2013 | Head et al. | |
| 2013/0159186 A1 | 6/2013 | Brudnicki et al. | |
| 2013/0166456 A1 | 6/2013 | Zhang et al. | |
| 2013/0173736 A1 | 7/2013 | Krzeminski et al. | |
| 2013/0185202 A1 | 7/2013 | Goldthwaite et al. | |
| 2013/0191290 A1 | 7/2013 | Glendenning | |
| 2013/0212017 A1 | 8/2013 | Bangia | |
| 2013/0246203 A1 | 9/2013 | Laracey | |
| 2013/0254028 A1 | 9/2013 | Salci | |
| 2013/0254117 A1 | 9/2013 | von Mueller et al. | |
| 2013/0275308 A1 | 10/2013 | Paraskeva et al. | |
| 2013/0297504 A1 | 11/2013 | Nwokolo | |
| 2013/0308778 A1 | 11/2013 | Fosmark et al. | |
| 2013/0311382 A1 | 11/2013 | Fosmark et al. | |
| 2013/0317982 A1 | 11/2013 | Mengerink et al. | |
| 2014/0007213 A1 | 1/2014 | Sanin et al. | |
| 2014/0013106 A1 | 1/2014 | Redpath | |
| 2014/0013114 A1 | 1/2014 | Redpath | |
| 2014/0019367 A1 | 1/2014 | Khan et al. | |
| 2014/0040137 A1 | 2/2014 | Carlson et al. | |
| 2014/0040628 A1 | 2/2014 | Fort et al. | |
| 2014/0222676 A1 * | 8/2014 | Lee | G06Q 20/14 705/44 |
| 2014/0236842 A1 | 8/2014 | Salminen | |
| 2014/0282834 A1 | 9/2014 | Guinan | |
| 2015/0019443 A1 * | 1/2015 | Sheets | G06Q 20/322 705/71 |
| 2015/0052064 A1 | 2/2015 | Karpenko et al. | |

FOREIGN PATENT DOCUMENTS

| | | |
|---|---|---|
| CN | 101072384 A | 11/2007 |
| CN | 101563870 A | 10/2009 |
| CN | 101567780 A | 10/2009 |
| CN | 101588577 | 11/2009 |
| CN | 101567780 A | 12/2009 |
| CN | 101834946 A | 9/2010 |
| CN | 101853544 | 10/2010 |
| CN | 102341817 | 2/2012 |
| CN | 102456193 A | 5/2012 |
| CN | 102480725 A | 5/2012 |
| CN | 102609841 A | 7/2012 |
| CN | 102685073 A | 9/2012 |
| CN | 102742211 A | 10/2012 |
| CN | 103116848 A | 5/2013 |
| EP | 2600275 A1 | 6/2013 |
| JP | 2014522067 | 8/2014 |
| KR | 20030084294 | 11/2003 |
| KR | 10 2007 0083087 | 8/2007 |

(56) References Cited

FOREIGN PATENT DOCUMENTS

| KR | 20090102752 | 9/2009 |
| KR | 10 2010 0111987 | 10/2010 |
| KR | 10-2012-0106238 A | 9/2012 |
| KR | 10-2012-0110926 A | 10/2012 |
| RU | 2376635 C2 | 12/2009 |
| RU | 2394275 C2 | 7/2010 |
| RU | 2467501 C2 | 11/2012 |
| WO | 2006128215 A1 | 12/2006 |
| WO | 2009138848 A2 | 11/2009 |
| WO | 2010 033968 A1 | 3/2010 |
| WO | 2012151590 A2 | 11/2012 |
| WO | 2012/167941 A1 | 12/2012 |
| WO | 2013086423 | 6/2013 |

OTHER PUBLICATIONS

Decision on Grant, dated May 22, 2018, in Russian Application No. 2016115043, 7 pages.
Final Office Action, dated Sep. 14, 2018, in U.S. Appl. No. 14/332,245, 32 pages.
First Office Action, dated Dec. 27, 2018, in Chinese Patent Application No. 201480056590.8, 5 pages.
EP14836208.0, Office Action, 13 pages, dated Jul. 22, 2019.
CN201480056590.8, Office Action, , 23 pages, dated Jul. 29, 2019.
EP14825781.9, Office Action, , 7 pages, dated Sep. 13, 2019.
Public Key Certificate, "Wikipedia", Available Online at: URL:https://en.wikipedia.org/w/index.php? , 8 pages, Jun. 22, 2013.
Office Action in Korean Patent Application No. 2016-7003736, dated Dec. 18, 2017, 7 pages.
First Office Action, dated Jan. 31, 2019, in Chinese Patent Application No. 201480063714.5, 8 pages.
CN201480050582.2 , "Office Action", dated Feb. 25, 2020, 21 pages.
EP14825781.9 , "Summons to Attend Oral Proceedings", Apr. 17, 2020, 13 pages.
EP14836208.0 , "Summons to Attend Oral Proceedings", Feb. 17, 2020, 17 pages.
KR10-2016-7003736 , "Notice of Decision to Grant", dated Mar. 10, 2020, 3 pages.
KR10-2018-7035630 , "Notice of Decision to Grant", dated Mar. 3, 2020, 5 pages.
Wikipedia , "X.509", Available Online at: URL:https://en.wikipedia.org/w/index.php?title—X.509&oldid=567241886, Aug. 5, 2013, 12 pages.
European Search Report dated Feb. 2, 2017 in European Patent Application No. 14845716.1, 8 pages.
AU2014321178 , "Second Examination Report", dated Nov. 28, 2019, 4 pages.
CN201480063714.5 , "Office Action", dated Dec. 31, 2019, 13 pages.
Russian Official Action, dated May 18, 2018, in Russian Patent Application No. 2016104765, 5 pages.
International Search Report and Written Opinion of the International Searching Authority dated Nov. 26, 2014 for PCT Patent Application No. PCT/US2014/051371, 10 pages.
U.S. Appl. No. 15/471,800 , "Non-Final Office Action", dated Jan. 24, 2020, 32 pages.
CN201480063714.5, "Office Action", 19 pages, dated Aug. 12, 2019.
First Office Action, dated Mar. 21, 2019, in Chinese Patent Application No. 201480050582.2, 9 pages.
Schneier Applied Cryptography, 1996, 8 pages.
ANSI-X9.63, Jul. 5, 1998, 125 pages.
Non-Final Office Action, dated Nov. 16, 2017, in U.S. Appl. No. 14/332,245, 27 pages.
Extended European Search Report dated Mar. 3, 2017, in European Application No. 14836208.0, 9 pages.
Extended European Search Report dated Feb. 23, 2017, in European Application No. 14825781.9, 7 pages.
International Search Report and Written Opinion, dated Nov. 19, 2014, in PCT Application No. PCT/US2014/046764, 11 pages.
AU2014306440 , "Second Examination Report", dated Nov. 27, 2019, 3 pages.
AU2018203139 , "First Examination Report", dated Oct. 14, 2019, 5 pages.
CN201480056590.8 , "Office Action", dated Dec. 13, 2019, 17 pages.
JP2018-132704 , "Office Action", dated Nov. 1, 2019, 6 pages.
U.S. Appl. No. 15/490,191, "Non-Final Office Action", dated Oct. 24, 2019, 27 pages.
U.S. Appl. No. 15/471,800, Final Office Action, dated Jul. 9, 2020, 32 pages.
U.S. Appl. No. 15/490,191, Final Office Action, dated May 14, 2020, 35 pages.
Application No. CN201480050582.2, Notice of Decision to Grant, dated Jul. 6, 2020, 4 pages.
Application No. CN201480056590.8, Office Action, dated Apr. 29, 2020, 15 pages.
IN201647013251, "First Examination Report", dated Jun. 3, 2020, 6 pages.
Application No. KR2016-7006730, Office Action, dated Jun. 18, 2020, 7 pages.
EP14845716.1, "Summons to Attend Oral Proceedings", dated Aug. 13, 2020, 8 pages.

\* cited by examiner

US 10,817,875 B2

SECURE REMOTE PAYMENT TRANSACTION PROCESSING INCLUDING CONSUMER AUTHENTICATION

CROSS-REFERENCES TO RELATED APPLICATIONS

This application is a non-provisional of and claims the benefit of priority to U.S. Provisional Application No. 61/880,802, filed Sep. 20, 2013, which is hereby incorporated by reference in its entirety for all purposes.

This application is related to U.S. Non-provisional application Ser. No. 14/332,245, filed Jul. 15, 2014, and U.S. Non-provisional application Ser. No. 14/461,227, filed Aug. 15, 2014, which are both hereby incorporated by reference in their entirety for all purposes.

BACKGROUND

Traditional remote transactions have limited security features and a higher risk of fraud because a consumer is typically not present at a merchant or service provider for verification that the payment credentials have not been stolen or intercepted and are not being used by a malicious third party. Accordingly, there is a need to increase the security of remote transactions initiated from communication devices.

Additionally, performing remote payments using untrusted merchant applications on communication devices (e.g., mobile devices) may cause serious data security problems because it is difficult to determine if an application is malware or otherwise is attempting to steal sensitive information. Accordingly, there is a need for a secure remote transaction processing system that authenticates a device and a user associated with the device during a remote transaction in an efficient and secure process so that sensitive information may be protected from malicious or untrusted applications.

Additionally, although systems implementing secure element based remote payment transactions may provide device authentication and validation, these systems fail to authenticate consumers or users associated with the communication device initiating the payment transaction during an authentication process. Accordingly, stolen and/or cracked devices may still be used to perform fraudulent transactions and system resources may be used in processing fraudulent transactions and performing multiple separate authentication processes for users, devices, etc. Therefore, there is a need for an authentication process that provides both user and device authentication in an efficient manner.

Furthermore, traditional e-commerce transaction systems that allow for the authenticating of users through username and password authentication or challenge-response authentication fail to provide an account issuer or service provider direct control over an authentication process or authorization process for a remote transaction. Accordingly, issuers associated with accounts being used in remote transactions may not be given the level of control and risk analysis that may be desirable to account issuers and other service providers. Accordingly, there is a need for a system that allows for direct control of authentication processes by issuers associated with a remote transaction.

Embodiments of the present invention address these problems and other problems individually and collectively.

BRIEF SUMMARY

Embodiments of the present invention are directed to methods, apparatuses, computer readable media and systems for securely processing remote transactions including consumer authentication using a communication device. For example, embodiments of the present invention allow consumers to use a mobile device comprising secure and sensitive payment credentials to initiate and process a remote payment transaction initiated through a merchant website or merchant application. The merchant website or merchant application may utilize a secure element based mobile payment application to obtain payment credentials (e.g., account number and expiration date) from the communication device instead of having the consumer provide the account number and expiry date using the keypad or obtaining the information from an unsecure memory. Accordingly, embodiments provide a secure process for transferring sensitive payment information as well as authenticating users and payment applications, while protecting the sensitive information from untrusted, unsecure, and/or potentially malicious mobile applications (e.g., a merchant application).

Further, embodiments incorporate the use of security information including both chip-based security values for authenticating a device (e.g., cryptograms) as well as user authentication data for authenticating users (e.g., personal identification numbers (PINs), passwords, passcodes, etc.) for remote transactions initiated though the payment application of the communication device. Accordingly, embodiments provide additional security over traditional e-commerce or remote payment transactions. Therefore, embodiments provide more secure and robust remote payment transaction systems. As such, embodiments enhance the security level of card not present transactions by providing verifiable security information in transactions that typically do not have the capability of including such security features.

One embodiment of the invention is directed to a method of processing a remote transaction initiated by a mobile device. The method comprises a server computer receiving a payment request including encrypted payment information. The encrypted payment information including security information and being encrypted using a first encryption key. The method further comprises decrypting the encrypted payment information using a second encryption key and obtaining an authentication response value for the remote transaction from an authentication computer associated with an account issuer. The authentication computer validates the security information before providing the authentication response value to the server computer. The method further comprises the server computer updating the decrypted payment information to include the authentication response value, re-encrypting the decrypted payment information using a third encryption key, and sending a payment response including the re-encrypted payment information to a transaction processor associated with the communication device. The transaction processor decrypts the re-encrypted payment information using a fourth encryption key and initiates a payment transaction using the decrypted payment information.

Another embodiment of the invention is directed to a server computer comprising a processor and a computer-readable medium coupled to the processor. The computer-readable medium comprises code, executable by the processor, for performing a method of processing a remote transaction. The method of processing the remote transaction comprises the server computer receiving a payment request including encrypted payment information. The encrypted payment information includes security information and is encrypted using a first encryption key. The method further comprises decrypting the encrypted payment information using a second encryption key and obtaining an authentication response value for the remote transaction from an authentication computer associated with an account issuer. The authentication computer validates the security information before providing the authentication response value to the server computer. The method further comprises the server computer updating the decrypted payment information to include the authentication response value, re-encrypting the decrypted payment information using a third encryption key, and sending a payment response including the re-encrypted payment information to a transaction processor associated with the communication device. The transaction processor decrypts the re-encrypted payment information using a fourth encryption key and initiates a payment transaction using the decrypted payment information.

Another embodiment of the invention is directed to a system for processing a remote transaction. The system comprising a communication device configured to send a payment request including encrypted payment information to a server computer. The encrypted payment information includes security information and the encrypted payment information is encrypted using a first encryption key. The system further comprises the server computer which is configured to receive the payment request including the encrypted payment information. The server computer is further configured to decrypt the encrypted payment information using a second encryption key and obtain an authentication response value for the remote transaction from an authentication computer associated with an account issuer. The server computer is further configured to update the decrypted payment information to include the authentication response value, re-encrypt the decrypted payment information using a third encryption key, and send a payment response including the re-encrypted payment information to a transaction processor associated with the communication device. The transaction processor is configured to decrypt the re-encrypted payment information using a fourth encryption key and initiate a payment transaction using the decrypted payment information. The system further comprises an authentication computer configured to receive an authentication request from the server computer including the security information, validate the security information, generate an authentication response including an authentication response value, and send the authentication response to the server computer.

These and other embodiments of the invention are described in further detail below.

DETAILED DESCRIPTION

Figure 1:
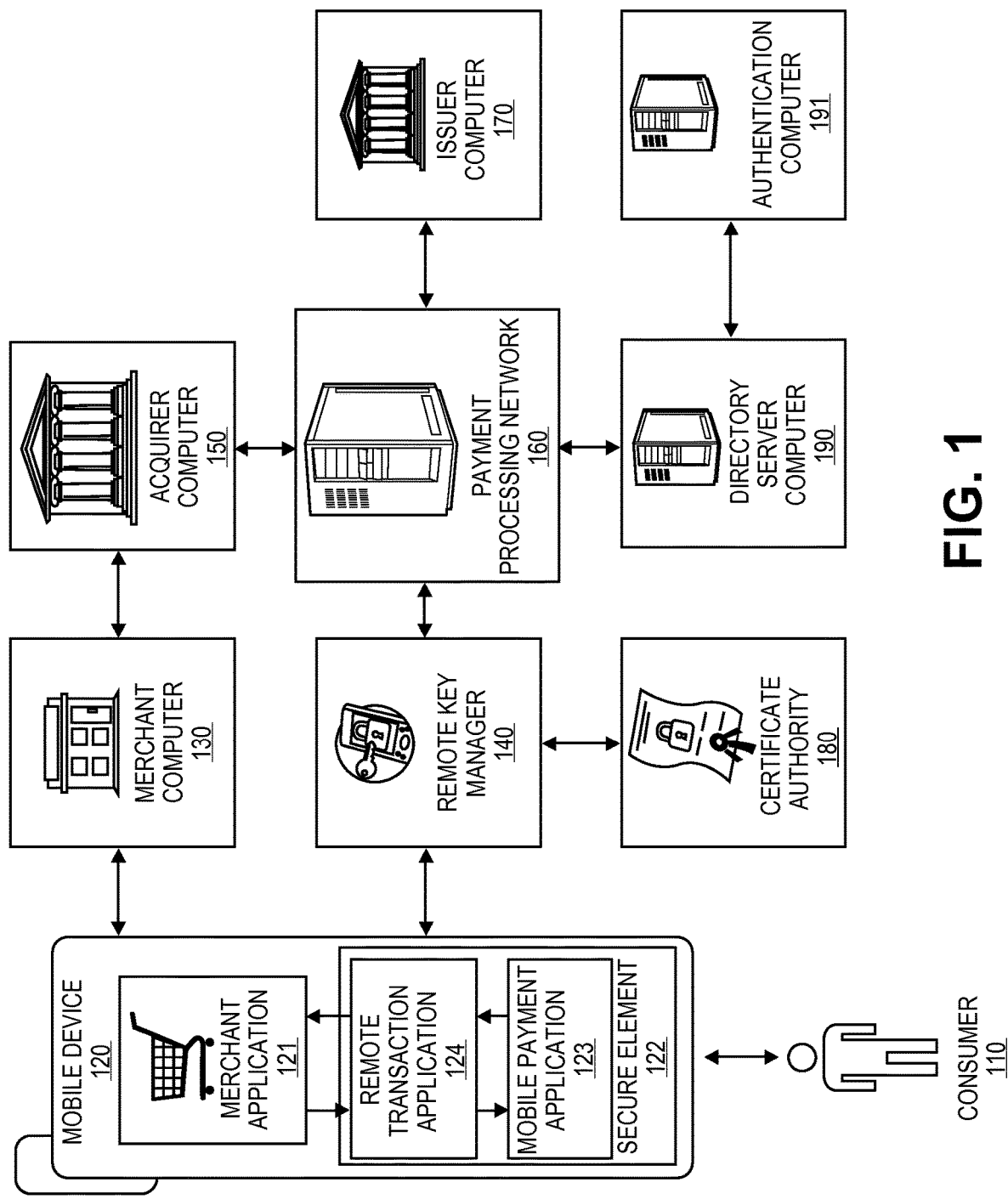
FIG. 1 shows a block diagram of an exemplary system for performing a remote transaction using a remote key manager associated with a payment processing network and a merchant application of a mobile device, according to some embodiments of the invention.

Embodiments of the present invention are directed to systems and methods for securely processing remote transactions initiated by untrusted merchant applications on a communication device. An untrusted application could be a legitimate application but due to the unsecure or potentially unsecure environment in which the application is operating, the application may not be trusted by a secure application or trusted execution environment storing or controlling access to sensitive information for a transaction (or multiple transactions). Embodiments provide a secure system that protects sensitive payment information stored in a secure memory of the mobile device, validates a merchant application before providing sensitive information, authenticates both a user and a device associated with the remote transaction in a secure and efficient manner, and allows for transmission of sensitive payment information in a secure manner to perform a remote payment transaction using a communication device.

When performing a remote electronic commerce (i.e., e-commerce) transaction on a communication device, a consumer provides payment credentials and other sensitive information to the merchant website or web server so that the merchant may identify and initiate payment for the transaction. Normally a consumer may key enter or otherwise input a primary account number (PAN), expiration date, and card verification value (e.g., CVV2) into the mobile device which then sends that information to a merchant server. However, this method is not secure and may lead to fraudulent transactions. For example, there is no way for a merchant to know if the consumer is authentic or if the consumer possesses the underlying payment device or if the consumer obtained the PAN, expiration date, and card verification value without the proper authorization.

Embodiments of the present invention provide an end-to-end secure authentication process between a communication device (e.g., mobile device) and an authentication server through a single interface system for processing remote transactions. An authentication computer associated with an account issuer may receive authentication data directly from a communication device, validate the authentication data, and authorize a requested transaction (or other operation) associated with a remote transaction through a secure and efficient communication architecture. Furthermore, the authentication data may include two factor authentication by including both device (e.g., security value generated using a shared secret) and user authentication data (e.g., personal identifier number, passcode, etc.) in a single communication and authentication process.

Accordingly, embodiments allow for authentication of a security value associated with a device and user authentication data associated with a user, as well as submission of other payment data to a payment processing network and/or account issuer for verification before a remote transaction is initiated. An authentication response may be provided by an authentication computer before a remote transaction is initiated through a payment processing network and an authentication response value may be embedded into the payment data for use in processing the transaction. Accordingly, the authentication response value may be validated by a payment processor and/or issuer during transaction processing as an added security measure for remote transaction processing.

According to embodiments of the present invention, a merchant web server computer or merchant application may securely obtain account information from a mobile payment application of a communication device that securely stores the account information. Additionally, because the transaction is being processed using a payment application that may be configured to provide security information along with payment credentials, the remote transaction may include higher security dynamic chip-based security data (e.g., a dynamic cryptogram) during a remote transaction. Accordingly, during an e-commerce transaction where a merchant typically would not be capable of receiving highly secure chip-based security data because of the consumer key entry of account information and/or the lack of access to a security chip embedded in a smart card or mobile device, embodiments of the present invention provide the dynamic authentication information and other chip data for validation during transaction processing.

Furthermore, embodiments allow a merchant computer to securely receive account credentials, user authentication data, and device security information from a payment application during a remote payment transaction. Accordingly, a remote merchant server computer may receive sufficient data to build a "card present" chip transaction authorization request message which provides a higher level of security than a typical remote transaction.

Embodiments of the invention have several advantages. For example, embodiments improve the security of payment transactions using untrusted or unknown merchant applications on a mobile device. In some embodiments, a remote key manager, a mobile gateway, a payment processing network, a mobile wallet provider, or any other third party system may be used to validate a merchant application associated with a merchant certificate, determine merchant keys associated with the validated merchant application, decrypt payment information, and re-encrypt the payment information using a trusted merchant's public key. This prevents unauthorized applications or devices from gaining access to the sensitive data, since the payment information is unreadable without the trusted transaction processor encryption key (e.g., merchant private key, merchant application private key, acquirer private key, etc.).

Furthermore, embodiments further improve the security of remote payment transactions initiated in an unsecure communication device environment through the dual factor authentication of a user and a device (e.g., payment application) during the remote transaction and before the remote transaction is initiated.

Further, because of the multiple key exchanges involved in the remote transaction processing, the sensitive information can always be protected when being transmitted or communicated to a destination entity. Accordingly, embodiments provide a secure communication process for transmitting sensitive information related to a remote transaction to allow for protection of sensitive information that may be static and re-used in future transactions (e.g., static account identifiers, expiration date, etc.).

Additionally, embodiments provide more efficient methods of performing both user and device authentication than systems that incorporate separate authentication processes. For example, traditional remote transaction authentication systems that allow a user to be authenticated by an account issuer or payment processor require a user to validate their identity through a separate or parallel process during an e-commerce transaction. For example, a consumer may log into an online account and submit a password along with their payment credentials. This is inefficient for the authentication systems and burdensome for the consumer. In contrast, embodiments of the present invention allow for both user and device authentication in an easy and efficient manner.

Furthermore, embodiments requires less integration between communication devices and issuer systems because embodiments provide a single point of contact for communication devices to interact with instead of previous systems that may require re-direction of the communication device to each access control server or authentication server associated with a different account issuer. Accordingly, embodiments of the present invention provide the advantage of a single secure integration point with a remote key manager that may then authenticate the remote transaction with an authentication computer and return authentication results directly to the communication device.

Therefore, the system avoids the use of a re-direct scheme for directing the communication device to an authentication computer for each issuer or service provider. Such re-direction to various authentication computers raises a number of integration problems where each particular authentication computer associated with a different issuer or other service provider has a different communication protocol, security permutation, set of interface commands, etc. Accordingly, in embodiments of the present invention, the mobile payment application and/or the remote transaction application of the communication device may implement a single set of APIs or other commands to initiate the authentication process. Accordingly, integration of the communication device with the remote key manager is much easier to manage and fewer updates, changes, and modifications to the remote transaction application are required.

Accordingly, embodiments of the present invention provide a secure remote transaction processing system that allows for (1) verification of an untrusted or unknown merchant application prior to providing sensitive information, and (2) provides a secure communication scheme for a transfer of information to a single integration point for validation and authentication of (i) a consumer and (ii) a device prior to initiation of a transaction through a payment processing network. Accordingly, embodiments provide a more efficient, secure, and easily implemented method of performing secure remote payment transactions including authentication of a consumer through a single authentication process.

Additionally, embodiments provide more secure payment systems by allowing the use of highly secure and difficult to reproduce information during a transaction. For example, the dynamic cryptogram or dynamic value provided during the transaction allows for a higher level of trust by a merchant that the consumer in fact is authorized to perform a transaction using the account. Accordingly, fewer fraudulent transactions and charge backs will be processed by payment processing networks, issuers, and merchants.

Finally, embodiments are more convenient to consumers and users because the system allows for a consumer to use payment information (e.g., account information) that is already present on a mobile device to initiate and process a transaction. Previous remote transactions required a consumer to enter payment information manually or used information that was not stored in a secure memory. Accordingly, embodiments provide a more secure and convenient method for consumers to initiate transactions from a mobile device.

Prior to discussing embodiments of the invention, description of some terms may be helpful in understanding embodiments of the invention.

A "remote transaction" may include any transaction where one party to a transaction is separated by some distance and/or by a device from another party to a transaction. For example, a remote transaction may include a "card-not present," electronic commerce, or other online transaction performed through communication between two or more devices. For instance, remote transactions may include devices that are not present in the same location or multiple devices where the two parties (e.g., a merchant and a consumer) are not using the same device to complete the transaction. Additionally, a remote transaction may include an in-store transaction that is not completed using a merchant point-of-sale device (i.e., access device) and instead is completed by a consumer using their mobile device to communicate with a remote (or local) merchant server computer configured to process the remote transactions. Traditionally, remote transactions have had a higher chance of fraud because remote transactions do not allow a payee the opportunity to identify the payer or otherwise ensure that the payment they are receiving is legitimate, as the two parties are not present in the same location during the transaction (such as in a "card present" or in-store transaction). A local, card present, face-to-face, or in-store transaction may include a transaction where two or more parties to a transaction are present in the same location, use the same transaction device, or is performed through at least one present individual or entity to authenticate the identity of a payer and/or payee.

Additionally, a remote transaction may include any type of transaction. For example, a remote transaction may include a payment transaction (e.g., a transaction associated with an exchange of goods or service for a monetary value), a non-payment transaction (e.g., an authentication transaction, an account provisioning transaction, or any other transaction that does not involve the exchange of monetary value for goods or services), and/or any other type of transaction associated with a communication device, a mobile application, a payment application, a payment processing network, an issuer, and/or any other entity within a transaction processing system.

A "payment request" may include a message comprising a request to process or initiate a payment. For example, the payment request may be sent from mobile device associated with a consumer in relation to a purchase transaction associated with goods or services provided by a merchant. The payment request may include any relevant information to the transaction including payment information (e.g., account identifiers, personal information, etc.), transaction information (e.g., merchant information, items being purchased, etc.), device information (e.g., mobile device phone number, secure element identifier, etc.), routing information (e.g., internet protocol (IP) address of a destination computer, identifier for destination computer, bank identification number (BIN), etc.), and any other relevant information to a payment transaction. For example, a payment request may include encrypted payment information for a transaction and may be sent to a third party computer that is configured to authenticate the payment request, validate a public key certificate, decrypt the encrypted payment information, extract a public key from the validated certificate, re-encrypt the decrypted payment information, and send the re-encrypted payment information to a transaction processor for initiation of a payment transaction. Accordingly, the payment request may include any information relevant to the secure process for transmitting sensitive data to a merchant server for processing a remote transaction.

"Payment information" may include any relevant information for performing a payment. For example, the payment information may include any sensitive account information and/or personal information that may be used to identify and/or authenticate a consumer account at an issuer. Further, in some embodiments, the payment information may also include merchant information, consumer information, mobile device information, routing information, or any other relevant information that may be used to administer, manage, and communicate payment transactions. As such, payment information may include both sensitive and non-sensitive information. Additionally, the payment information may include a portion of account information, personal information, etc., that may be used to perform a transaction. For example, payment information may include the sensitive information associated with a transaction or account and may be sent along with other non-sensitive information that may not be considered payment information (e.g., transaction amount, etc.).

"Payment credentials" may include any information that allows a processor to identify, verify, and/or process a payment transaction using a consumer account. For example, a payment credential may include an account identifier (e.g., primary account number (PAN)), a token (e.g., account identifier substitute), expiration date, card verification value (e.g., CVV, CVV2, dCVV, etc.), a dynamic cryptogram or dynamic value (e.g., dynamic authentication data), personal information associated with an account (e.g., address, etc.), an account alias, or any other relevant information.

In some embodiments, the payment credentials may be stored in a secure memory of a mobile device. The secure memory of the mobile device may be configured such that the data stored in the secure memory may not be directly accessible by outside applications and a mobile payment application associated with the secure memory may be accessed to obtain the payment credentials stored on the secure memory. Accordingly, a merchant application may interface with a mobile payment application or with a remote transaction application or other application in order to interface with the mobile payment application in order to gain access to the payment credentials stored on the secure memory. In some embodiments, a software development kit (SDK), an application programming interface (API), or other third party programming code or module may be accessed in order to request payment credentials from a mobile payment application. Further, in some embodiments, the secure memory may be configured such that the payment credentials or any other payment information may be provided in an encrypted form using session derived keys based on a shared master derived key (MDK) associated with the issuer of the payment credentials stored on the secure memory of the mobile device. Additionally, a valid digital or public key certificate may be present in order for an application, SDK, or API to access the secure memory (e.g., secure element).

"Transaction information" may include any data associated with a transaction. For example, transaction information may include a transaction amount, transaction time, transaction date, merchant information (e.g., registered merchant identifier, address, merchant IP address, etc.), product information (e.g., serial numbers, product names or other identifiers, etc.). The transaction information may be provided to a communication device (e.g., mobile device) by a merchant server computer before or after the consumer initiates a payment transaction through the merchant application. In some embodiments, the transaction information may be used to identify a specific merchant associated with a transaction using the merchant information included in the transaction information.

"Merchant information" may include any information that is associated with a merchant, payee, service provider, producer, or other relying party in a transaction. For example, merchant information may include a merchant identifier that was determined during registration with a remote payment service, remote key manager, payment processing network, or other transaction processing entity associated with the remote transaction processing system. In some embodiments, the merchant identifier may be used to determine a registered merchant computer public key, merchant application public key, and/or acquirer public key associated with a transaction.

"Encrypted payment information" may include any payment information that has been made unintelligible to some parties to prevent unauthorized access to the payment information. For example, the encrypted payment information may not be read by a recipient without access to a shared secret or access to a designated encryption key. As such, the encrypted payment information may be made unintelligible through a process that is reversible and repeatable such that two entities can share information using a shared secret or encryption keys without unauthorized entities being able to understand or gain access to the sensitive payment information or sensitive payment credentials within the payment information (unless they gain access to the shared secret or encryption keys).

Additionally, in some embodiments, the encrypted payment information may include any combination of encrypted sensitive information and unencrypted less sensitive or non-secure information. For example, in some embodiments, encrypted payment information may include encrypted payment credentials (e.g., sensitive account identifiers and expiration date) and unencrypted transaction information (e.g., transaction amount, product identifiers, etc.). In other embodiments, the encrypted payment information may include all of the relevant transaction information encrypted. For instance, in some embodiments, the encrypted payment information may include both encrypted payment credentials and encrypted transaction information.

In some embodiments, the encrypted payment information may be generated by a mobile payment application of a mobile device such that the mobile payment application may have encryption keys (e.g., third party public keys) that are used to encrypt stored or received payment credentials and/or other payment information for a transaction. For example, a mobile payment application may store a third party public encryption key. The third party public encryption key may be paired with a third party private encryption key that may be securely stored at a remote key manager, a mobile gateway, a payment processing network, a mobile wallet provider, or any other third party configured to process a remote payment transaction. The third party private key may be used to decrypt the encrypted payment information and allow the third party to further encrypt the secure payment information with a public key for a designated transaction processor. Accordingly, the encrypted payment information may be used to allow for secure remote transaction processing. Additionally, the third party encryption key may include a symmetric encryption key and the keys are not limited to public/private key pairs.

"Decrypted payment information" may include payment information that has been converted from an unintelligible state to an understandable state. For example, decrypted payment information may include the result of applying an appropriate encryption key to encrypted payment information to obtain the original payment information. For instance, a third party private key may be applied to encrypted payment information that was encrypted with a third party public key in order to decrypt the encrypted payment information and obtain the underlying payment information. Further, where the encrypted payment information includes both encrypted and unencrypted information, the decrypted payment information may be obtained by decrypting the encrypted portions while not decrypting the unencrypted portion.

"Re-encrypted payment information" may include any payment information that has been made unintelligible to prevent unauthorized access to the payment information after being decrypted at least once. For example, the re-encrypted payment information may be encrypted or otherwise made unintelligible to an unauthorized entity using a different encryption key or encryption algorithm than the originally encrypted payment information. For example, decrypted payment information that was encrypted and decrypted using a third party public and private key (or a third party symmetric encryption key), respectively, may be re-encrypted using a transaction processor public key (e.g., a merchant public key, merchant application public key, acquirer public key, etc.) and sent to the transaction processor. As such, the same information (e.g., payment information) may be encrypted using two different keys that allow for two different entities to securely obtain the underlying information while protecting the information from any other entities.

A "payment response" may include a message comprising a response to a request to process or initiate a payment. For example, the payment response may be sent from a server computer in response to a purchase request associated with a remote transaction request associated with goods or services provided by a merchant. The payment response may include any relevant information to the transaction including payment information (e.g., account identifiers, personal information, etc.), transaction information (e.g., items being purchased, merchant information, etc.), device information (e.g., mobile device phone number, secure element identifier, etc.), routing information (e.g., internet protocol (IP) address of a destination computer, bank identification number (BIN), etc.), and any other relevant information. For example, a payment response may include re-encrypted payment information that has been encrypted with a transaction processor public key and may be sent to the transaction processor for further processing. For instance, the transaction processor may decrypt the re-encrypted payment information using a transaction processor private key and may initiate a payment transaction using the decrypted payment information. Further, in some embodiments, the payment response may include authentication response information that identifies whether a transaction, account, consumer, and/or other entity to a transaction has been authenticated.

A "mobile gateway" can be a server computer or a series of server computers that are configured to communicate with a communication device. For example, a mobile gateway may communicate with a mobile device using over-the-air (OTA) messages or using any other communication networks and protocols. For instance, the mobile gateway may be configured to provide a secure communications channel (i.e., secure channel) with a mobile device over which information can be transmitted securely to and from the mobile device using a mobile communications network, the Internet, and/or any other relevant communications network.

A "transaction processor" may include any entity that is associated with processing a transaction. For example, a merchant, a communication device (e.g., mobile device, desktop computer, etc.), a merchant application or other mobile application on a communication device (e.g., an acquirer application or payment service provider application), an acquirer computer, a payment processing network, and any other entity in a transaction processing eco-system may be a transaction processor. In some embodiments, a transaction processor may be associated with a particular public key (e.g., merchant public key, merchant application public key, acquirer public key, etc.) and private key (e.g., merchant private key, merchant application private key, acquirer private key, etc.) that may be used to encrypt and decrypt payment information during processing of a remote payment transaction.

As such, in some embodiments, the transaction processor may include any entity configured to decrypt the encrypted (or re-encrypted) payment information and initiate a payment transaction. A payment transaction may be initiated through any suitable manner including passing the decrypted payment information to another party or by generating and/or mapping decrypted payment information to an authorization request message. For example, in some embodiments, the transaction processor may initiate a payment transaction by mapping the decrypted payment information to an authorization request message configured to be processed by a payment processing network.

A "security information" may include any data that may be used to authenticate or validate a party or a device. For example, security information may include user authentication data in order to authenticate a user of a device, an account holder, or a consumer associated with an account or transaction. Additionally, security information may include a security value associated with a device, account, or account issuer.

"User authentication data" may include any information that may be used to validate the identity or permissions of a user. For instance, the user authentication data may include a personal identification number (PIN), passcode, password, username, or any other secret information that is shared between trusted parties in order to validate the identity of one or more parties. For instance, in some embodiments, user authentication data may include one or more of a personal identification number (PIN), a passcode, a password, a biometric identifier, or any other unique user information that may be shared and validated by another party. Additionally, the user authentication data may include an indication of a previously authenticated user (e.g., the results of a biometric validation of a user).

Additionally, security information may include a security value that may be used to authenticate a device. A "security value" may include any information that may be used to authenticate a device, account, or payment application as being authentic. The security value may include a static value or a dynamic value. Further, the security value may be generated using a shared secret or other algorithm that may be validated by another entity or system. For example, a security value may include a dynamic value that may change over time (e.g., periodically), change per use (e.g., per transaction), and/or change based on received information (e.g., input information to an algorithm) and may be validated by a system that also has access to a shared algorithm and input data to re-create and validate the security value. For instance, a security value may change every time a transaction is initiated and may be generated using a shared secret algorithm or other shared information between two entities such that one entity may validate that the other entity has access to the shared secret and is thus, authentic. This may also be referred to as authentication data.

In some embodiments, the security value may include a cryptogram. For example, a cryptogram may be generated per transaction based on a derived algorithm that is specific to a consumer device and/or issuer account and may be validated at a payment processor or an issuer of the account for each transaction. Such dynamic values may be referred to as dynamic card verification values (e.g., dCVV, dCVV2), unique authentication verification values (UAVV), token authentication verification value (TAVV), etc., and may be distinguished based on the input data and the algorithm used to generate the verifiable dynamic values. For example, a token authentication verification value may use a token (or other account substitute) as an input to a verification algorithm while a dynamic card verification value may use a primary account number (PAN) as an input to the same or a different verification algorithm.

In other embodiments, a secret algorithm used to generate a security value may be known by a single entity. For example, in some embodiments, a remote transaction may be authenticated before an authorization request message is generated and an issuer or a payment processing network may generate an authentication response value using a secret algorithm. When the transaction is initiated and the authorization request message is generated, the authentication response value may be included in the authorization request message and the payment processing network or account issuer may validate the authentication response value using the same secret algorithm and input data to validate the transaction. Accordingly, security values may include cryptograms generated using shared keys (e.g., dynamic verification values, token authentication data, etc.) or secret keys (e.g., authentication response values).

In some embodiments, a payment processing network and/or issuer computer 170 may authenticate security information before receiving an authorization request message for a payment transaction. In such embodiments, a payment processing network and/or issuer computer may return an authentication response including an authentication response value indicating validation of the authentication information if the authentication information is authenticated and/or validated. Accordingly, a remote transaction processor (e.g., payment processing network computer, mobile gateway, remote key manager computer, etc.) may substitute the authentication information with the authentication response value in the payment information before re-encrypting the payment information and sending to the transaction processor for initiation of the payment transaction. Thereafter, the authentication response value may be returned to the payment processing network in order to inform the transaction entity that the payment transaction was previously authenticated. Such systems increase the security of transaction processing systems and minimize the chances that the transaction is fraudulent since multiple authentication processes occur at various times during the transaction processing. Additionally, such systems can efficiently authenticate both users and payment devices before a transaction is submitted through a payment processing network and through a single authentication process.

An "authentication response value" may include any data that informs an entity that data, an entity, or a process has been authenticated. For example, an authentication response value may be generated similarly to the security value explained above but may be generated using a different shared secret or algorithm such that another entity within the transaction processing eco-system that has access to the shared secret may determine that the message, account, or other information included in the message has been authenticated by an entity. For instance, particular static data elements (e.g., account identifier, expiration date, transaction time, date, etc.) associated with a transaction may be used as inputs to generate an authentication response value during an authentication process and the calculation may be repeated (using the same data elements) during the payment phase after receiving the authorization request message, to validate that the authentication response value is correct and associated with the same transaction information.

A "payment application" or "mobile payment application" may include any application configured to facilitate a payment transaction from a communication device (e.g., mobile device or any other electronic communication device). For example, a mobile payment application may store sensitive payment information and/or payment credentials for a consumer account in a secure manner such that the payment information, account information, payment credentials, personal information, or any other relevant information may be protected from unauthorized access. The payment application may be configured to provide the sensitive information to an authorized software application or module on a communication device, a contactless element, or any other software or hardware configured and authorized to communicate with the payment application. For example, a mobile payment application may be configured to interface with other mobile applications or merchant applications on a mobile device in order to provide payment information for a transaction. For instance, the mobile payment application may provide a software development kit (SDK) or application programming interface (API) that merchant applications and/or other mobile applications may use to interface with the mobile payment application. The mobile payment application may be configured to provide the sensitive information in encrypted form using stored keys on a secure memory.

Further, in some embodiments, the mobile payment application may comprise any API, service, application, applet, or other executable code suitable to retrieve information from a secure element, generate payment information (e.g., a cryptogram or other security value, encrypted payment credentials, etc.) for a transaction, and communicate with a remote transaction application, merchant application, and/or any other application in order to securely communicate with a server computer (e.g., remote key manager, mobile gateway, payment processing network, third party service provider, etc.). The mobile payment application may include or be configured to obtain stored information including a payment processing network public key, payment credentials, third party keys, mobile gateway credentials, and/or any other relevant information and may be capable of communicating with a mobile gateway or other remote server computer to obtain issuer updates of any of the relevant information.

A "merchant application" or "mobile application" may include any application associated with a party to a transaction. For example, a merchant application may be associated with a particular merchant or may be associated with a number of different merchants and may be capable of identifying a particular merchant (or multiple merchants) which are parties to a transaction. For instance, the merchant application may store information identifying a particular merchant server computer that is configured to provide a sales environment in which the merchant server computer is capable of processing remote transactions initiated by the merchant application. Further, the merchant application may also include a general purpose browser or other software designed to interact with multiple merchant server computers as long as the browser is configured to identify the merchant server computer and process a remote transaction. The merchant application may be installed on general purpose memory of a mobile device and thus, may be susceptible to malicious attacks, cracks, etc. Accordingly, the merchant application may be treated as an untrusted or unknown application by secure systems within the mobile device and remote payment transaction processing system.

In some embodiments, a merchant application may initiate a payment transaction by sending decrypted payment information to a merchant server computer and the merchant server computer may then generate an authorization request message for the payment transaction using the decrypted payment information. In other embodiments, the merchant application may be configured to generate an authorization request message and send the authorization request message to a merchant server for processing.

Additionally, in some embodiments, a merchant application may be operated by or associated with an acquirer, payment service provider, or back-end processor that is operating on behalf of one or more merchants and/or processing one or more merchants' remote transactions. For example, the merchant application may include a payment service provider that is configured to process remote transactions on behalf of a merchant computer. Additionally, an acquirer may process transactions on behalf of merchant computers and may provide an acquirer application that performs similar functionality to the merchant application by allowing consumers to initiate remote payments through the acquirer application.

A "public/private key pair" may include a pair of linked cryptographic keys generated by an entity. The public key may be used for public functions such as encrypting a message to send to the entity or for verifying a digital signature which was allegedly made by the entity. The private key, on the other hand may be used for private functions such as decrypting a received message or applying a digital signature. The public key will usually be authorized by a body known as a certification authority (i.e., certificate authority) which stores the public key in a database and distributes it to any other entity which requests it. The private key will typically be kept in a secure storage medium and will usually be known to the entity or trusted parties. However, the cryptographic systems described herein may feature key recovery mechanisms for recovering lost keys and avoiding data loss.

A "public key" may include any encryption key that may be shared openly and publicly. The public key may be designed to be shared and may be configured such that any information encrypted with the public key may only be decrypted using a private key associated with the public key (i.e., a public/private key pair).

A "private key" may include any encryption key that may be protected and secure. For example, the private key may be securely stored at an entity that generates a public/private key pair and may be used to decrypt any information that has been encrypted with the associated public key of the public/private key pair.

A "digital signature" may refer to the result of applying an algorithm which allows a signing party to manifest, and a verifying party to verify, the authenticity and integrity of a document. For example, for a public/private key pair, the signing party may act by means of the private key and the verifying party may act by means of the public key. This process may certify the authenticity of the sender and the integrity of the signed document because of the so-called principle of nonrepudiation which does not allow disowning what has been signed. A certificate or other data that includes a digital signature by a signing party is said to be "signed" by the signing party.

A "certificate" may include an electronic document or data file that establishes the identity and/or authenticity of an entity. For example, a certificate may use a digital signature to bind a public key with data associated with an identity. The certificate may include one or more data fields, such as the legal name of the identity, a serial number of the certificate, a valid-from and valid-to date for the certificate, certificate-related permissions, or any other relevant information to identify and/or authenticate an entity or the certificate itself. For instance, a certificate may contain a "valid-from" date indicating the first date the certificate is valid, and a "valid-to" date indicating the last date the certificate is valid. Further, a certificate may also contain a hash of the data in the certificate including the data fields. Additionally, each certificate may be signed by a certificate authority.

A "certificate authority" may include any entity configured to issue certificates. The certificate authority may prove its identity using a certificate authority certificate, which includes the certificate authority's public key. The certificate authority certificate may be signed by another certificate authority's private key, or may be signed by the same certificate authority's private key. The latter is known as a self-signed certificate. The certificate authority also typically maintains a database of all certificates issued by the certificate authority.

In a typical certificate issuing process, the certificate authority receives an unsigned certificate from an entity whose identity is known. The unsigned certificate includes a public key, one or more data fields, and a hash of the data in the certificate. The certificate authority may sign the certificate with a private key corresponding to the public key included on the certificate authority certificate. The certificate authority may then store the signed certificate in a database, and issue the signed certificate to the entity. Thereafter, the entity may use the certificate as a means for presenting the authenticity and identity of the entity.

In some embodiments, a certificate authority may include any of the entities from the transaction processing ecosystem. For example, a payment processing network, remote key manager, issuer, acquirer, or any other entity within the transaction system may also be responsible for issuing and certifying certificates. For instance, a merchant, merchant application, or acquirer computer that is configured to process remote transactions may be register with a remote key manager, payment processing network, mobile wallet provider, or any other third party in order to obtain a public key certificate signed by the respective entity that allows the entity to validate the certificate and ensure the certificate is valid for any given transaction. In some embodiments, an entity within the remote payment transaction processing system may contact a certificate authority to determine whether the status of a certificate has been updated, is in good standing, has been revoked, etc. Accordingly, the certificate authority may be configured to provide status information regarding issued certificates.

A "server computer" may include a powerful computer or cluster of computers. For example, the server computer can be a large mainframe, a minicomputer cluster, or a group of servers functioning as a unit. In one example, the server computer may be a database server coupled to a web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

Embodiments of the present invention described herein include multiple different embodiments that may be combined in any suitable manner, as one of ordinary skill in the art would recognize. For example, in the various embodiments described below, various different parties, merchant applications, mobile payment applications, and transaction processors are described and a specific flow diagram is provided as an example. These examples are provided for illustration of the concepts of the present invention and are meant to be non-limiting. Accordingly, features from the various embodiments may be combined in any suitable manner including using registered public keys and public key certificates in different configurations than are provided explicitly in each illustrative system described herein. Accordingly, this is just one example of the various combinations that could be provided according to some embodiments of the present invention which may be described in more detail below. Furthermore, additional information regarding the various configuration options that may be available may be found in U.S. Non-provisional application Ser. No. 14/332,245, filed Jul. 15, 2014, which is hereby incorporated by reference in its entirety for all purposes.

I. Exemplary Systems

FIG. 1 shows a block diagram of an exemplary system 100 for performing a remote transaction using a remote key manager 140 and a merchant application 121 of a mobile device 120, according to some embodiments of the invention. The system 100 comprises a user (e.g., consumer 110), a communication device (e.g., mobile device 120) including a merchant application 121, a secure element 122, a remote transaction application 124, and a mobile payment application 123, a remote key manager 140, a certificate authority 180, a merchant computer 130, an acquirer computer 150, a payment processing network 160, a directory server 190, an authentication computer 191, and an issuer computer 170. The various entities may be configured to communicate with one another over any suitable wireless or wired communication network and using any suitable communications protocol, including open or proprietary communications protocols.

An "issuer" may typically refer to a business entity (e.g., a bank) that maintains financial accounts for a user and often issues a portable consumer device such as a credit or debit card to the user. The issuer may also issue or provisioning account information to a mobile device 120 to allow for mobile payments initiated by a mobile device. A "merchant" is typically an entity that engages in transactions and can sell goods or services. An "acquirer" is typically a business entity (e.g., a commercial bank) that has a business relationship with a particular merchant or other entity. Some entities can perform both issuer and acquirer functions. Some embodiments may encompass such single entity issuer-acquirers. Each of the entities may comprise one or more computer apparatuses (e.g., merchant computer 130, acquirer computer 150, payment processing network 160, and issuer computer 170) to enable communications, or to perform one or more of the functions described herein.

The payment processing network 160 may include data processing subsystems, networks, and operations used to support and deliver certificate authority services, authorization services, exception file services, transaction scoring services, and clearing and settlement services. An exemplary payment processing network 160 may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 160 may include one or more server computers 161. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 160 may use any suitable wired or wireless network, including the Internet.

In some card present or in store payment transactions, the user purchases a good or service at a merchant using a mobile device 120. For example, the user's mobile device 120 can interact with an access device (not shown) at a merchant associated with merchant computer 130. For example, the user may tap the mobile device 120 against an near-field communication (NFC) reader in the access device. Alternately, in a remote or "card not present" transaction, the user may indicate payment details to a merchant computer 130 electronically, such as in an online transaction.

An authorization request message may be generated by mobile device 120 or merchant computer 130 and then forwarded to the acquirer computer 150. After receiving the authorization request message, the authorization request message is then sent to the payment processing network 160. The payment processing network 160 then forwards the authorization request message to the corresponding issuer computer 170 associated with an issuer associated with the user.

An "authorization request message" may be an electronic message that is sent to a payment processing network 160 and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

After the issuer computer 170 receives the authorization request message, the issuer computer 170 sends an authorization response message back to the payment processing network 160 to indicate whether the current transaction is authorized (or not authorized). The payment processing network 160 then forwards the authorization response message back to the acquirer computer 150. In some embodiments, payment processing network 160 may decline the transaction even if issuer computer 170 has authorized the transaction, for example depending on a value of the fraud risk score. The acquirer computer 150 then sends the response message back to the merchant computer 130.

An "authorization response message" may be an electronic message reply to an authorization request message generated by an issuing financial institution 170 or a payment processing network 160. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network 160) to the merchant computer 130 that indicates approval of the transaction. The code may serve as proof of authorization. As noted above, in some embodiments, a payment processing network 160 may generate or forward the authorization response message to the merchant.

After the merchant computer 130 receives the authorization response message, the merchant computer 130 may then provide the authorization response message to the user. The response message may be displayed by the mobile device 120 or may be printed out on a physical receipt. Alternately, if the transaction is an online transaction, the merchant may provide a web page or other indication of the authorization response message as a virtual receipt. The receipts may include transaction data for the transaction.

At the end of the day, a normal clearing and settlement process can be conducted by the payment processing network 160. A clearing process is a process of exchanging financial details between an acquirer and an issuer to facilitate posting to a customer's payment account and reconciliation of the user's settlement position.

In the remote transaction processing system of FIG. 1, the mobile device 120 is configured to initiate and process a remote transaction with a merchant computer 130 using a remote key manager 140 to provide a secure remote payment transaction environment, even when using an unknown merchant application 121 or other mobile application is installed on a communication device (e.g., mobile device 120).

A user (e.g., consumer 110) may operate a communication device (e.g., mobile device 120) to perform any number of functions that the mobile device 120 is configured to perform. For example, the consumer 110 may use mobile device 120 to conduct remote payment transactions by communicating with a remote key manager 140 and a merchant computer 130. The merchant computer 130 may deliver available products and services to the merchant application 121 which the consumer 110 may use to initiate a remote transaction, whether located at a merchant location or remote from the merchant.

The communication device (e.g., mobile device 120) may be configured to communicate with a remote key manager 140 that is configured to facilitate and/or process the remote transaction. The remote key manager 140 is configured to perform a number of functions related to a remote transaction including receiving encrypted payment information, validate a public key certificate associated with the remote transaction, decrypt the encrypted payment information using a remote key manager key, validate security information through any number of authentication processes, and re-encrypt the payment information using a public key associated with a transaction processor (e.g., merchant, merchant processor, acquirer, etc.) for the transaction. The various modules of the remote key manager 140 are described in further detail in FIG. 3.

A "communication device" may include any electronic computing device. For example, a communication device may include a mobile device 120 that may include a mobile phone, tablet, netbook, laptop, or any other suitable mobile computing device. The mobile device 120 may comprise a merchant application 121, a remote transaction application 124, and a mobile payment application 123. The mobile payment application 123 and the remote transaction application 124 may be stored in a secure memory (e.g., secure element 122).

Merchant application 121 may include any mobile program, software, or other suitable executable code suitable to conduct a payment transaction. In some embodiments, the merchant application 121 may be a merchant-specific application. In other embodiments, the merchant application 121 may be a general purpose application, such as a web browser. Further, the merchant application 121 may be associated with parties that are not merchants and instead process payments on behalf of merchants or other service providers (e.g., payment service providers, acquirers, etc.).

Secure element 122 may be any hardware or software component operable to securely store any information and/or secure applications. For example, the secure element 122 may be operable to store payment information. A secure element 122 is an example of a trusted execution environment (TEE). Trusted execution environments may be implemented through the use of software or hardware elements and may be present on the communication device or a remote server computer (e.g., cloud based TEE). Further, a mobile payment application 123 may be provisioned and stored on the secure element 122 to securely access personalized sensitive information (e.g., payment credentials, tokens, account identifiers, etc.) associated with a consumer's financial account. For instance, in some embodiments, secure element 122 may include a secure crypto-processor or a contactless integrated circuit to protect information stored on the secure element 122. The secure element 122 may have a separate processor, information stored thereon may be encrypted with secret keys only held by trusted service managers or other designated entities, and the secure element 122 may contain any other hardware such that the secure element 122 may be a secure area where important information (e.g., payment credentials, encryption keys, and any other sensitive information) may be stored. Further, the secure data elements of the secure element 122 may be accessed using the special secret keys that certain trusted service managers may manage.

Additionally, in some embodiments, the trusted execution environment may be provided by a remote server computer that allows for delivery of sensitive information to a mobile payment application through a similar process as that described herein without the use of a secure element or other trusted execution environment on a communication device. For instance, sensitive information that is valid for a limited time period may be delivered to a communication device before a transaction to allow for similar processes as described herein to be performed without requiring a secure element or other hardware implemented trusted execution environment to be present on the communication device.

The merchant application 121 may include a remote transaction SDK (not shown) or third party service layer that may include any API, application, applet, or other executable code suitable to interface with a remote transaction application 124 and/or third party server system interface application (e.g., mobile wallet provider, mobile gateway, remote key manager 140, etc.). For example, a remote transaction SDK may be embedded in a merchant application 121 and may be used by the merchant application 121 to retrieve payment information from a remote transaction application 124 on a secure element 122 in order to interface with a mobile payment application 123 provisioned on a secure element 122. Additionally, although the remote transaction SDK is described as being part of the merchant application 121, the remote transaction SDK could also be an independent application or could be embedded into an operating system of the mobile device 120.

The remote transaction application 124 includes a secure application provisioned into the secure element 122 of the mobile device 120. The remote transaction application 124 provides a secure area for the storage of a public key certificate and/or other encryption key for a third party computer system (e.g., remote key manager 140, mobile wallet provider, mobile gateway, etc.). The remote transaction application 124 (also referred to as a remote transaction applet) may be configured to communicate with a mobile payment application 123 (e.g., Visa™ Paywave™ application) or other payment application that is stored on a secure element 122 of the communication device (e.g., mobile device 120). Additionally, the remote transaction application 124 may be configured to communicate with a remote key manager 140 or other third party system that is configured to securely facilitate the initiation and authentication of a remote payment transaction.

Accordingly, the remote transaction application 124 may provide access control verification for the mobile payment application 123 (e.g., provides security functions for the mobile payment application 123) by allowing access to the mobile payment application 123 when a consumer 110 has provided secure credentials or otherwise been authenticated. For example, if a signature associated with a merchant certificate cannot be validated or if a certificate is not matched with a certificate authority 180, the remote transaction application 124 may decline a request for a remote transaction from the merchant application 121 and the transaction processing may end (and the consumer 110 may be prompted to try a different payment method or to try again). Alternatively, if the certificate is valid the remote transaction application 124 may pass the request for the payment information to the mobile payment application 123.

Mobile payment application 123 may include any application programming interface (API), service, application, applet, or other executable code suitable to retrieve payment information from a secure storage module or secure element 122 and communicate with a merchant application 121. In some embodiments, mobile payment application 123 may be secured. For example, mobile payment application 123 may run in the secure element 122 (as shown in FIG. 2) or other trusted environment, as a kernel service, or at a higher permission level than merchant application 121.

Mobile payment application 123 may include a certificate associated with the remote key manager 140, which may be used to encrypt payment information and other communications using a public key (or other encryption key) associated with remote key manager 140. In some embodiments, mobile payment application 123 may be operable to generate security values (e.g., cryptograms) associated with the payment information. For example, mobile payment application 123 may be operable to a generate a security value including a dynamic card verification value (dCVV2) associated with a payment account. In other embodiments, the mobile payment application 123 may be capable of generating specific dynamic authentication requests or other dynamic values that may be validated by a payment processing network 160 sharing a secret with the personalized mobile payment application 123.

Figure 2:
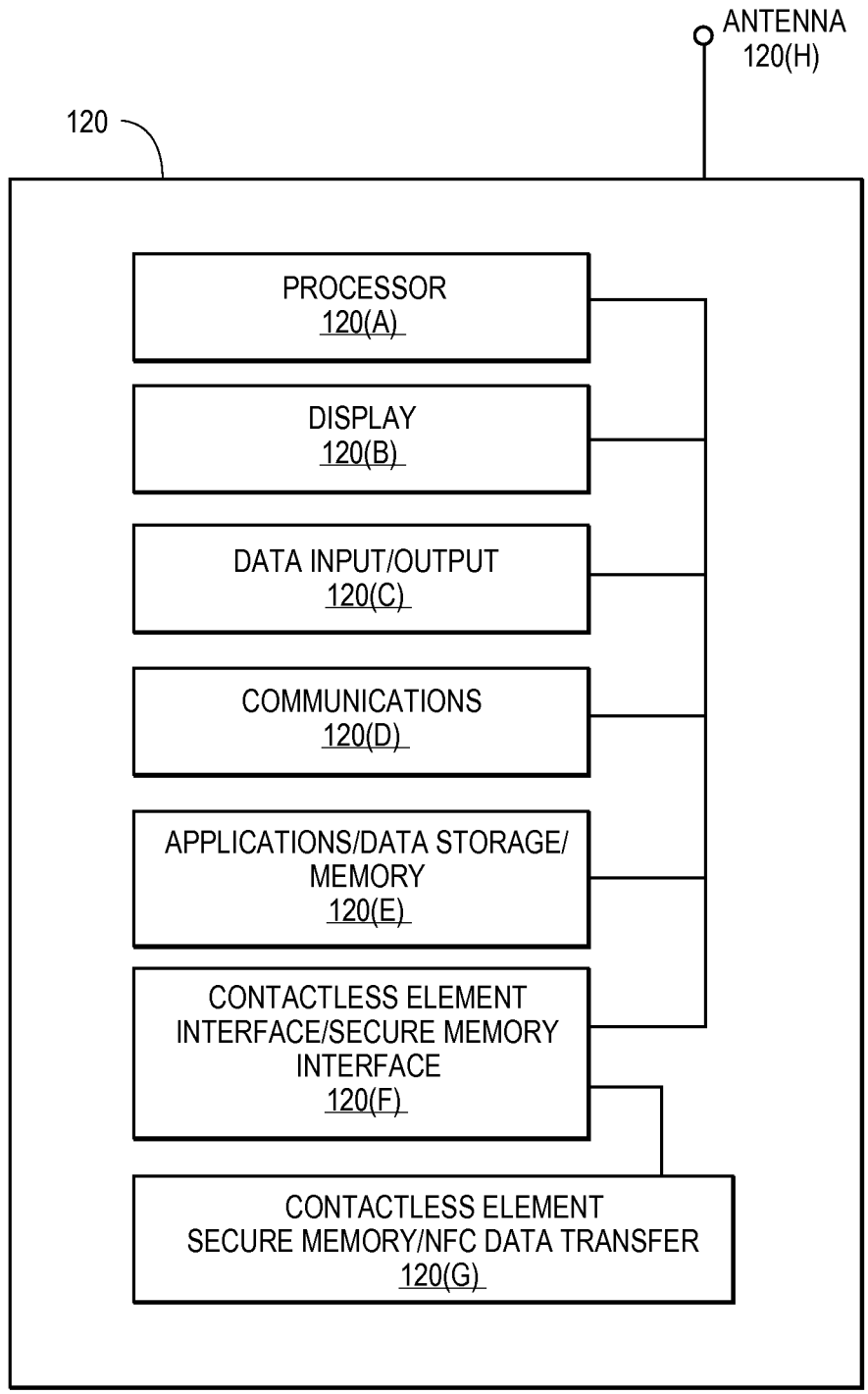
FIG. 2 shows a block diagram of an exemplary mobile device that may be used with some embodiments of the invention.

FIG. 2 shows a block diagram of an exemplary communication device (e.g., mobile device 120), according to some embodiments of the invention. Mobile device 120 may include circuitry that is used to enable certain device functions, such as telephony. The functional elements responsible for enabling those functions may include a processor 120(A) that is programmed to execute instructions that implement the functions and operations of the device. Processor 120(A) may access data storage 120(E) (or another suitable memory region or element) to retrieve instructions or data used in executing the instructions, such as merchant applications, remote transaction application 124, or other mobile applications. Data input/output elements 120(C), such as a keyboard or touchscreen, may be used to enable a user to operate the mobile device 120 and input data (e.g., user authentication data). Data input/output elements may also be configured to output data (via a speaker, for example). Display 120(B) may also be used to output data to a user. Communications element 120(D) may be used to enable data transfer between mobile device 120 and a wired or wireless network (via antenna 120(H), for example) to assist in connectivity to the Internet or other communications network, and enabling data transfer functions.

Mobile device 120 may also include contactless element interface or secure memory interface 120(F) to enable data transfer between contactless element 120(G) and other elements of the device, where contactless element 120(G) may include a secure memory (e.g., a secure element 122) and a near field communications data transfer element (or another form of short range or contactless communications technology). As noted, a cellular phone or similar device is an example of a communication device (e.g., mobile device 120) that may be used in accordance with embodiments of the present invention. However, other forms or types of devices may be used without departing from the underlying concepts of the invention. Further, devices may not require the capability to communicate using a cellular network in order to be suitable for use with embodiments of the present invention.

Figure 3:
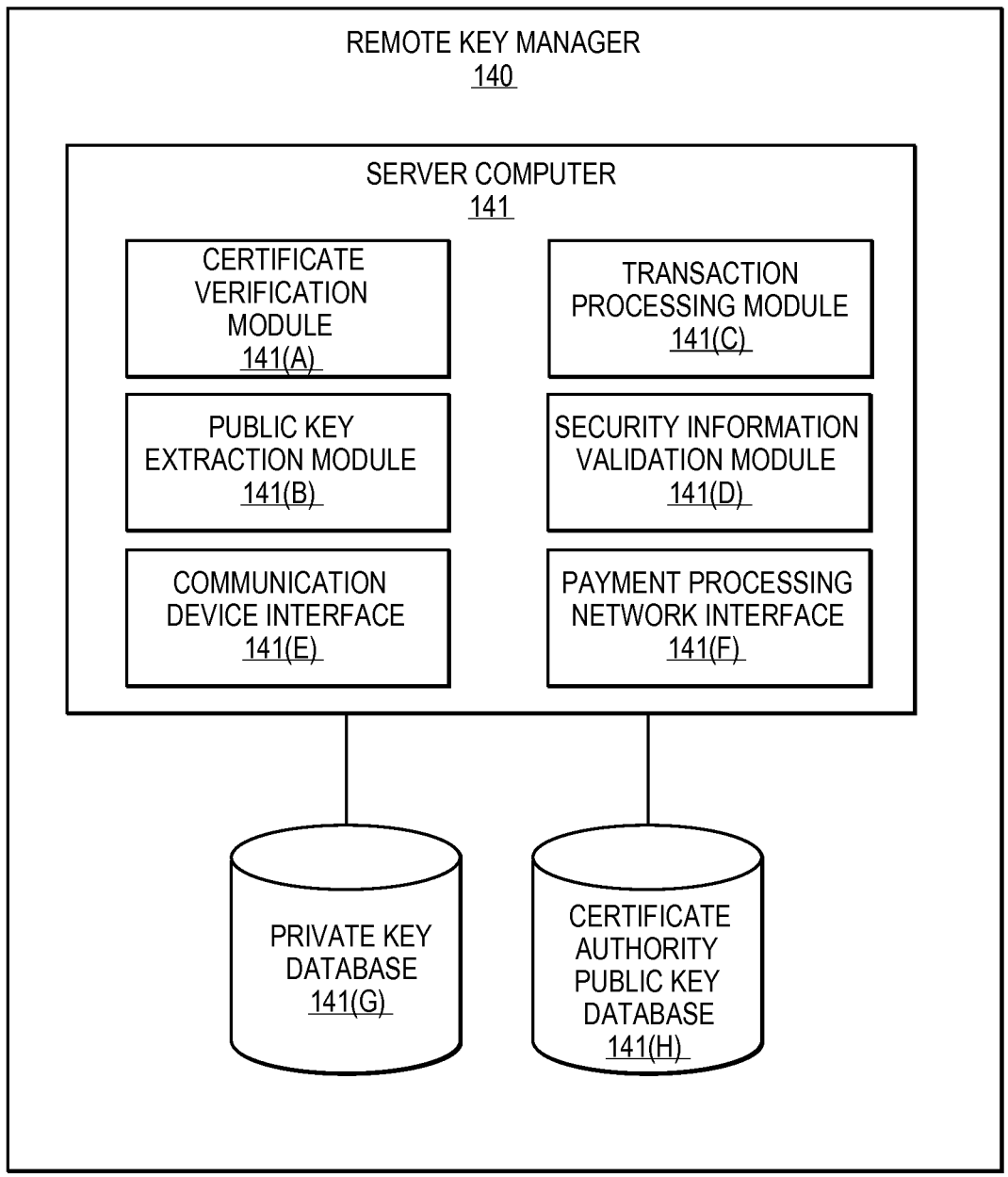
FIG. 3 shows a block diagram of an exemplary remote key manager configured to manage dual factor authentication for remote transactions, according to some embodiments of the invention.

FIG. 3 shows a block diagram of an exemplary remote key manager 140, according to some embodiments of the invention. The remote key manager 140 may comprise a server computer 141, a private key database 141(G), and a certificate authority root public key database 141(H). The server computer 141 may comprise a certificate verification module 141(A), a public key extraction module 141(B), a transaction processing module 141(C), a security information validation module 141(D), a communication device interface 141(E), and a payment processing network interface 141(F). The server computer 141 may further comprise a processor (not shown) and a computer-readable medium (not shown) coupled to the processor, the computer-readable medium comprising code, executable by the processor, for performing a method as described in embodiments herein.

The certificate verification module 141(A) may include any software module that may be configured to verify a merchant certificate (or other transaction processor certificate) as being associated with a particular merchant, being authentic, and/or being valid. The certificate verification module 141(A) may perform any number of steps in order to accomplish this functionality. For example, the certificate verification module 141(A) may communicate with a certificate authority 180 to ensure that the public certificate is currently valid and in good standing (e.g., has not been reported, via certificate revocation lists (CRLs) or online certificate status protocol responders (CSPRs) or the like, as compromised or revoked). Additionally, the certificate verification module 141(A) may use a certificate authority root public key stored in a certificate authority public root key database 141(H) to validate that the public key certificate is legitimate and signed by an appropriate certificate authority 180.

Returning to FIG. 1, the certificate authority 180 may be associated with the remote key manager 140 to allow for validation of the status of a certificate. Additionally, the certification authority may be associated with a merchant computer 130 and may issue a public key certificate to the merchant computer 130 that may be used during remote payment transaction processing to establish trust between the third party server computer (e.g., remote key manager 140) and the merchant computer 130 that the merchant computer 130 is authentic and is authorized to obtain the sensitive payment credentials in the encrypted payment information. The process by which the certificate authority 180 may issue a merchant certificate is described in more detail in FIG. 5 below. Some non-limiting examples of certificate issuing methods may be found in ANSI X9.24 Part 2 *Retail Financial Services Symmetric Key Management Part 2: Using Asymmetric Techniques for the Distribution of Symmetric Keys and ISO* 11568 *Part 4 Banking— Key management (retail)—Part 4: Asymmetric cryptosystems—Key management and life cycle.*

The public key extraction module 141(B) may be configured to extract a public key from a received or stored public key certificate for use in processing a remote transaction. The public key may be extracted using any suitable processes. In some embodiments, the public key may be extracted before or after validation and/or verification of the public key certificate.

The transaction processing module 141(C) may be configured to process a payment request and provide a payment response in return to the payment request, assuming a received or stored public key certificate is valid and active for the transaction. For example, the transaction processing module 141(C) may decrypt received encrypted messages using a remote key manager private key stored in a private key database 141(G) and use the extracted transaction processor public key from the transaction processor certificate (e.g., merchant certificate) to re-encrypt the decrypted message or information from the message for secure delivery to the transaction processor (e.g., merchant computer 130). The transaction processing module 141(C) may further communicate the re-encrypted message (e.g., payment response) to the communication device (e.g., mobile device 120) for delivery to the appropriate transaction processor (e.g., merchant computer 130).

The security information validation module 141(D) may include any software module configured to initiate an authentication communication with a payment processing network 160 in order to initiate an authentication process. For example, the security information validation module 141(D) may be configured to send sending an authentication request including the security information to a payment processing network server computer 161 associated with the decrypted payment information using the payment processing network interface 141(F). The payment processing network server computer 161 may determine an authentication computer 191 associated with the decrypted payment information and forward the authentication request to the authentication computer 191. The authentication computer 191 may then validate the security information and generate an authentication response including an authentication response value. The security information validation module 141(D) may then receive the authentication response including the authentication response value from the payment processing network computer 161 through the payment processing network interface 141(F).

In some embodiments, where the remote key manager computer 141 may be associated with a payment processing network 160, the remote key manager 140 may be configured to determine an authentication computer 191 associated with the remote payment transaction by incorporating the directory server functionality into the remote key manager 140. Accordingly, the security information validation module 141(D) of the remote key manager computer may determine an authentication computer 191 associated with the decrypted payment information and may send an authentication request including the security information to the authentication computer 191. The authentication computer 191 may validate the security information and return an authentication response including an authentication response value indicating validation of the security information.

The communication device interface 141(E) may be configured to communicate with a communication device (e.g., mobile device 120). For example, a communication device interface 141(E) may incorporate any suitable communication protocols or network interfaces in order to communicate with a mobile device 120. The mobile device interface 141(D) may receive a message (e.g., a payment request) from a mobile device 120 and may be configured to parse the message to determine relevant information included in the message.

The payment processing network interface 141(F) may include a hardware and/or software interface that is configured to communicate requests to a payment processing network 160. The payment processing network interface 141(F) may include a secure channel that allows for secure exchange of information to the payment processing network 160. For example, hardware security interfaces or session based keys may be exchanged to ensure highly secure connection with the payment processing network server computer 161.

The private key database 141(G) may comprise a private key for the remote key manager 140 (also referred to as a remote key manager private key). The private key may be generated through any suitable manner and may be stored securely such that unauthorized entities are not provided access to the private key. In some embodiments, the private key may be stored in a local memory or in a remote secured database. In some embodiments, the private key may be one of a private/public key pair associated with the remote key manager 140 and the public key may be provided to merchant applications 121, mobile payment applications 123, mobile devices 120, remote transaction applications (not shown), and any other transaction entities that are configured to encrypt payment information for processing by the remote key manager 140. Additionally, in some embodiments, the private key database 141(G) may include a symmetric encryption key that may be used where data is encrypted using a symmetric encryption key instead of public/private encryption key pair.

The root public key database 141(H) may comprise a root public key for the certificate authority 180 associated with a public key certificate. In some embodiments, a single certificate authority root public key may be stored at the remote key manager 140 associated with a single certificate authority 180 (and may be stored locally at the remote key manager computer) while in other embodiments, multiple certificate authority root keys may be stored in a database or locally at the remote key manager computer. The certificate authority root public key may be used in a signature validation process to ensure the public key certificate is valid and active with an issuing certificate authority 180.

Figure 4:
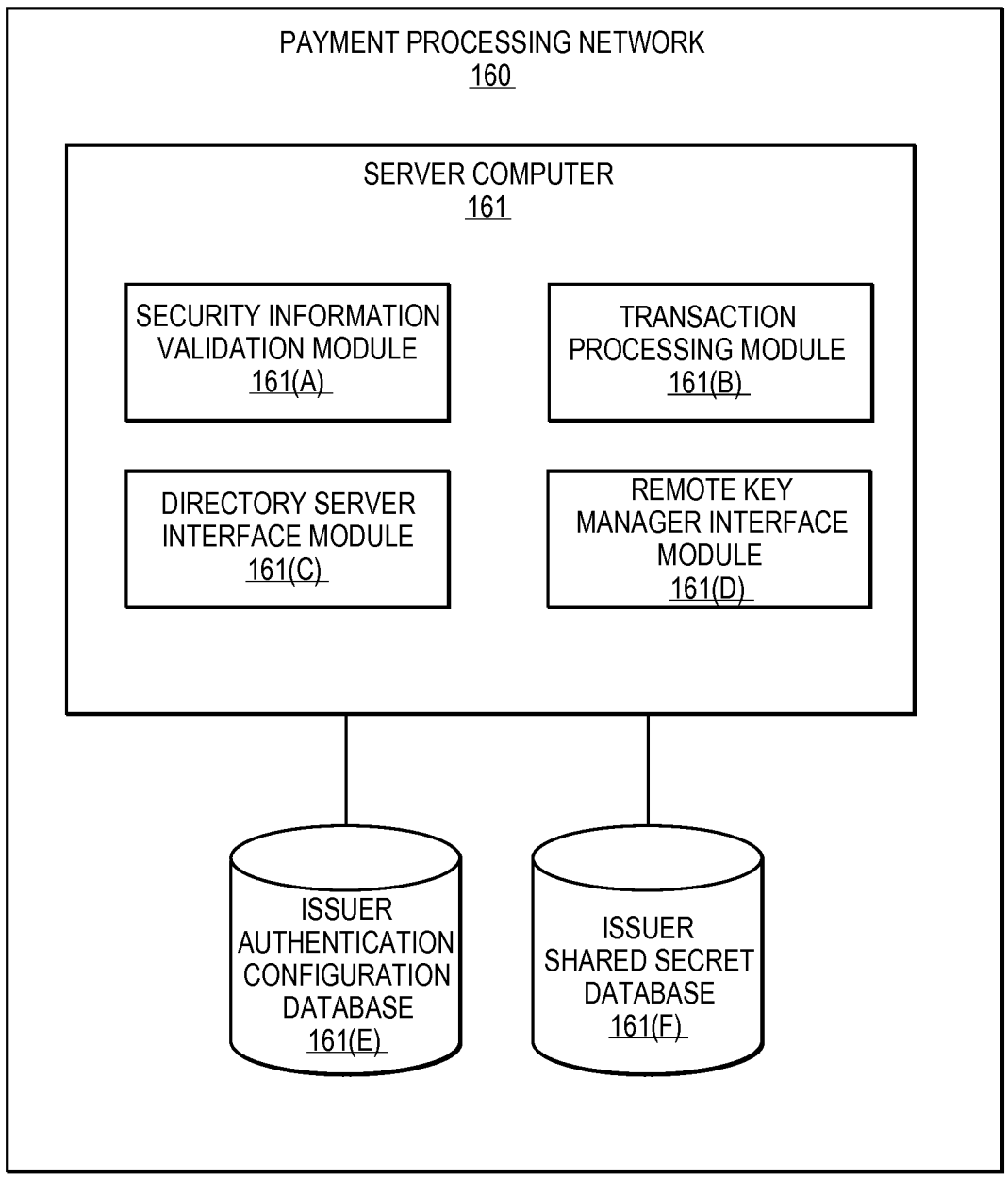
FIG. 4 shows a block diagram of some components of an exemplary payment processing network configured to manage authentication requests and responses for remote transactions and process secure remote transactions, according to some embodiments of the invention.

FIG. 4 shows a block diagram of some components of an exemplary payment processing network 160, according to some embodiments of the invention. The payment processing network 160 may comprise a server computer 161, an issuer authentication configuration database 161(E), and an issuer shared secret database 161(F). The server computer 161 may comprise a security information validation module 161(A), a transaction processing module 161(B), a directory server interface module 161(C), and a remote key manager interface module 161(D). The server computer 161 may further comprise a processor (not shown) and a computer-readable medium (not shown) coupled to the processor, the computer-readable medium comprising code, executable by the processor, for performing a method as described in embodiments herein.

A security information validation module 161(A) may include any software module that is configured to validate security information (e.g., user authentication data, security values, or any other authentication information) associated with a payment request. For example, the security information validation module 161(A) may be configured to determine an authentication computer 191 associated with an authentication request and forward the authentication request to the relevant authentication computer 191. The security information validation module 161(A) may determine an authentication computer 191 using a directory server that may be accessed through a directory server interface module 161(C).

Returning to FIG. 1, in some embodiments, a directory server computer 190 may be used to determine an authentication computer 191 configured to validate security information for a given remote transaction. A directory server 190 may include any computer, device, and/or system that is configured to receive an authentication request, determine an authentication computer 191 associated with the authentication request, and forward the authentication request to the authentication computer 191. For example, a directory server may include an issuer authentication configuration database 161(E) including issuer identifiers associated with payment accounts and corresponding authentication computers designated for each issuer identifier. For instance, the directory server may comprise a list of bank identification numbers (BINs) associated with the payment processing network 160 (e.g., VisaNet™) and a corresponding authentication computer address associated with each BIN. For instance, the authentication computer address may include a IP address, HTTP address, internal directory address, or any other information that allows the directory server to determine and provide the appropriate location for the authentication request to be forwarded to ensure the correct authentication computer 191 receives and validates the security information.

An authentication computer 191 may include any computer, system, device, or combination of devices configured to receive authentication requests including security information associated with a remote payment transaction, validate the security information, and provide an authentication response value indicating that the security information has been validated and/or authenticated. Authentication computers may include an authentication database including personal information, usernames, passwords, PINs, passcodes, shared secrets, and any other relevant information to allow a system to authenticate a user has authorization or permission to perform a transaction.

The authentication computer 191 may be associated and/or operated by the payment processing network 160, by the issuer, or by a third party. For example, the account issuer may provide issuer profile information (e.g., authentication rules, risk rules, etc.) and shared secrets associated with account holders, devices, and any other relevant information to a payment processing network 160 or other third party computer system to allow for the payment processing network or other entities to perform the authentication of the security information. Such a system may be considered as an on-behalf-of authentication system where the issuer has provided authentication information to a third party to allow for the authentication functionality to performed by the third party on-behalf-of the issuer. An authentication computer 191 that is associated or managed with an account issuer may be considered an access control server (ACS).

In some embodiments, the authentication computer 191 may also include the issuer computer 170 associated with authorization decision processing as well. Accordingly, in some embodiments, the payment processing network 161 may send authentication requests to an issuer computer 170 in a similar manner to payment transaction processing (e.g., through the use of ISO messages or other pre-configured interfaces with an issuer computer).

Further, in some embodiments, more than one authentication computer 191 may be used during a remote transaction authentication process. For example, a payment processing network 160 may perform device authentication on-behalf-of an account issuer through the account issuer sharing a shared secret associated with the account with an on-behalf-of authentication computer operated by the payment processing network 160. However, the account issuer may not provide consumer profile information and corresponding user authentication data with the payment processing network 160 and instead, the user authentication data may be passed to an issuer authentication computer 191, access control server (ACS), or other computer configured to authenticate consumer information. Accordingly, the payment processing network 160 may validate the device authentication information in parallel or in combination with the access control server (ACS) of the issuer validating the user authentication data.

Additionally, in some embodiments the payment processing network authentication computer may pass authentication results to the account issuer access control server computer (i.e., authentication computer associated with an issuer). For example, the security information passed to the authentication computer 191 may include an indication that the security value (e.g., cryptogram) and/or the user authentication data (e.g., passcode) was previously authenticated by the payment processing network 160 on-behalf-of the account issuer 170. Accordingly, in some embodiments, an authentication computer 191 associated with an account issuer 170 may participate in the generation of an authentication response value or other indication of authentication of the consumer and/or device, without performing the direct validation of the security information. Further, in some embodiments, the roles may be reversed with an authentication computer associated with the payment processing network 160 generating the authentication response value based on the validation of the security information by an authentication computer 191 associated with an account issuer 170.

An authentication computer 191 may use shared secrets or shared algorithms to validate a security value that uses repeatable input data to re-calculate and compare a dynamic security value (e.g., cryptogram) for a transaction. For example, the security value (e.g., cryptogram) may be generated by the mobile payment application 123 using an account identifier, expiration date, transaction time, transaction amount, or any other suitable transaction information that may be available to both the mobile payment application 123 and the authentication computer 191 associated with the account issuer computer 170 and/or payment processing network 160 (or any other processing entity). For example, an algorithm may be shared between the mobile payment application 123 and the authentication computer 191 associated with the payment processing network 160 or account issuer computer 170 or other processing entity in order to allow for validation of the security information.

Accordingly, returning to FIG. 4, in some embodiments, the security information validation module 161(A) may forward an authentication request received from a remote key manager 140 through the remote key manager interface module 161(D) to a directory server computer 190 associated with the payment request using the directory server interface module 161(C).

The directory server interface module 161(C) may include a hardware and/or software interface that is configured to communicate authentication requests and responses to a directory server computer 190 or system. The directory server interface module 161(C) may include a secure channel that allows for secure exchange of information to the directory server computer 190. For example, hardware security interfaces or session based keys may be exchanged to ensure highly secure connection with the directory server computer 190.

However, in other embodiments, the functionality of the directory server may be incorporated into the payment processing network 160 (and/or remote key manager 140) such that the payment processing network 160 (or remote key manager computer) may determine an appropriate authentication computer 191 based on information included in the authentication request. For example, the payment processing network computer may determine an authentication computer 191 associated with the authentication request by parsing account credentials (e.g., a primary account number, a token or account substitute, etc.) from the authentication request and determining an issuer associated with the account credentials. For instance, in some embodiments, the authentication request may include a primary account number (PAN) associated with the remote payment transaction and the PAN may include a bank identifier (e.g., BIN) associated with an issuer of the account. Accordingly, the security information validation module 161(A) may compare the BIN to an issuer authentication configuration database 161(E) to determine an authentication computer 191 associated with the issuer's account. Furthermore, the issuer may have certain accounts authenticated by different authentication computers and thus, in some embodiments, the directory server may determine an authentication computer 191 associated with an account range or account number associated with the issuer.

An issuer authentication configuration database 161(E) may include any information relevant to determining an authentication computer 191 associated with an account and/or account issuer. The issuer authentication configuration database 161(E) may also include authentication preferences associated with issuers and profile information for risk decisioning, transaction processing, authorization decisions, etc., associated with an account issuer. Furthermore, the issuer authentication configuration database 161(E) may be found at the payment processing network 160 or at the directory server depending on the configuration options of the system.

An issuer shared secret database 161(F) may include any information that allows an entity to validate security information and/or other authentication information associated with an issuer account. For example, in some embodiments, the shared secret database may include shared secret algorithms for re-generating security values associated an account or may include a searchable database of relevant consumer authentication and device authentication information.

Further, the security information validation module 161 (A) may be configured to generate an authentication response value using a secret algorithm securely stored at the payment processing network 160 and the secret algorithm may not be shared with any other entities in the remote transaction processing system. Accordingly, the security information validation module 161(A) may validate the dynamic cryptogram generated by the mobile payment application 123 (e.g., security value) and may return another dynamic cryptogram (e.g., authentication response value) that may be returned to the mobile device 120 and submitted with any authorization request message that is generated for the transaction. Accordingly, the payment processing network 160 may obtain the authentication response value during the transaction processing of the authorization request message and may validate that the authentication response value matches the generated authentication response message originally generated by the payment processing network 160 during the initial processing of the remote payment transaction. Accordingly, the payment processing network 160 may be assured that the transaction has not been altered and that the transaction data is the same as the transaction that was originally authenticated by the payment processing network computer 161.

A transaction processing module 161(B) may include any software module that is configured to receive an authorization request message and process the authorization request message for a transaction. Additional details regarding the processing of the authorization request message is explained above.

The remote key manager interface module 161(D) may include a software and/or hardware interface that is configured to allow the payment processing network 160 to interface with the remote key manager 140. The remote key manager interface module 161(D) may include a secure channel that allows for secure exchange of information to the remote key manager server computer. For example, hardware security interfaces or session based keys may be exchanged to ensure highly secure connection with the remote key manager server computer 141. The payment processing network 160 may receive authentication requests from the remote key manager 140 through the remote key manager interface module 161(D) and send authentication responses to the remote key manager 190 (or other entity depending on the configuration, for example, a mobile gateway) through the remote key manager interface module 161(D).

A. Merchant Certificate Issuance/Provisioning Methods

Figure 5:
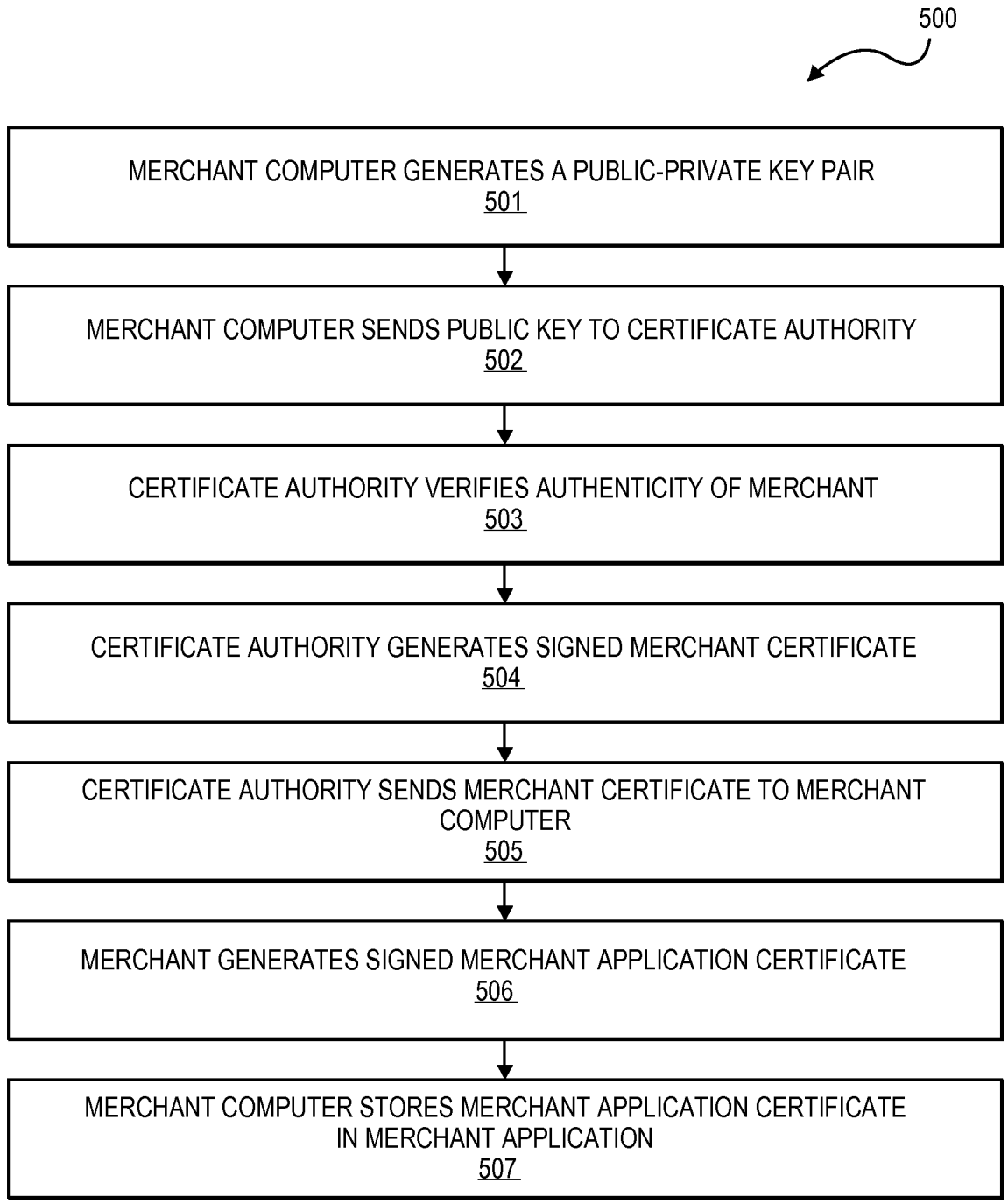
FIG. 5 shows a flow diagram of an exemplary method for provisioning merchant public/private key pairs and merchant application certificates using a certificate authority, according to some embodiments of the invention.

FIG. 5 shows a flow diagram of an exemplary method 500 for provisioning merchant public/private key pairs and merchant application certificates using a certificate authority 180, according to some embodiments of the invention. In some embodiments, method 500 may be performed in order to provide a merchant computer 130 with a certificate indicating the merchant's trustworthiness or authenticity. Subsequently, the received merchant certificate may be included in merchant applications installed on or provided to mobile devices.

At step 501, a merchant computer 130 generates a merchant public-private key pair. The merchant public-private key pair may be generated in any suitable format such as RSA or elliptical curve cryptography (ECC). In some embodiments, a merchant private key may be stored securely on a merchant computer 130.

At step 502, the merchant computer 130 sends the merchant public key of the public-private key pair to a certificate authority 180. The certificate authority 180 may include any suitable entity configured to issue and validate a certificate. For example, in some embodiments, the certificate authority 180 may include a payment processing network 160, a remote key manager 140, a mobile wallet provider, an entity that is not included in the typical payment transaction processing system, or any other entity.

At step 503, the certificate authority 180 verifies the authenticity of the merchant using any suitable means. For example, the merchant computer 130 may provide the certificate authority 180 with information providing the identity of the merchant computer 130 as being operated by the merchant. In one example, the merchant computer 130 may provide a document signed by an authorized signatory of a merchant (e.g., the merchant organization's president).

At step 504, certificate authority 180 generates a signed merchant certificate using the received merchant certificate signing request which includes the merchant public key. Typically, the merchant certificate may be signed by the certificate authority root private key. The certificate authority signature allows an entity to validate the authenticity of the merchant certificate using a certificate authority root public key.

At step 505, the certificate authority 180 sends the signed merchant certificate to the merchant computer 130.

At step 506, the merchant computer 130 generates a signed merchant application certificate using the merchant private key. Thus, a chain of trust may be established from the merchant application certificate, to the merchant certificate, to the certificate authority root certificate. In some embodiments, the signed merchant application certificate may be associated with an instance or version of a merchant application 121. For example, the merchant application certificate may be used to verify that the merchant application 121 is from the merchant.

At step 507, the merchant computer 130 stores the merchant application certificate in a merchant application 121. Thus, when the merchant application 121 is loaded onto a mobile device 120, the authenticity of the merchant application 121 may be verified. Additionally, the merchant computer 130 may store a merchant application private key associated with the merchant application certificate locally to allow for decryption of information encrypted using the merchant application public key.

It should be understood that FIG. 5 is intended to be descriptive and non-limiting. For example, in some embodiments of the invention, the merchant public-private key pair may be generated by the certificate authority 180, and the merchant private key may be provided to the merchant computer 130 securely, for example using a Public-Key Cryptography Standards (PKCS) #12 message. Furthermore, in some embodiments, similar techniques may be used to generate a merchant certificate associated with a merchant server computer or other entity within the secure transaction processing system.

B. Exemplary Methods

Figure 6:
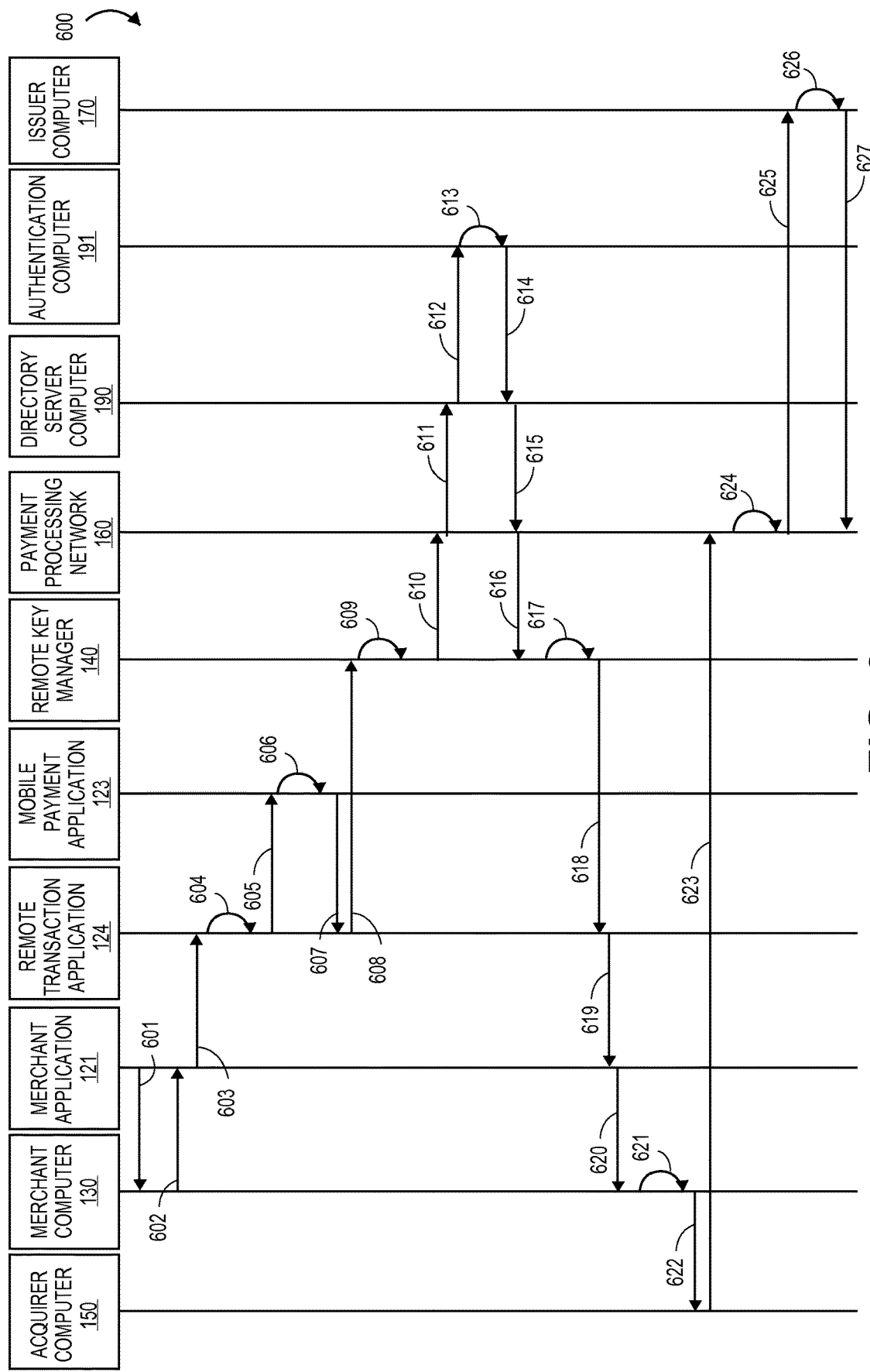
FIG. 6 shows a flow diagram of an exemplary method for processing a remote transaction using a remote key manager, a payment processing network, and a merchant application of a mobile device, according to some embodiments of the invention.

FIG. 6 shows a flow diagram of an exemplary method 600 for processing a remote transaction using a remote key manager 140 and a merchant application 121 of a mobile device 120, according to some embodiments of the invention. In some embodiments, the method of FIG. 6 may be performed after a merchant application certificate has been provisioned (e.g., in accordance with method 500) and stored in the merchant application 121 with or without a merchant application private key. Subsequently, the method of FIG. 6 may be performed in order to conduct a remote payment transaction for goods or services.

As explained above, embodiments allow for interfacing with a payment processing network 160 which provides multiple advantages including additional authentication capabilities including validation of authentication values before a transaction is submitted through a payment network using an authorization request message to the payment processing network 160. Accordingly, the payment processing network 160 may perform additional authentication processes (e.g., risk management, velocity checks, etc.) on the payment request (and associated consumer account) before a payment is initiated, which may allow the payment processing network 160 to inform a merchant system whether a transaction is authentic before the payment transaction is initiated through an authorization request message. The merchant may subsequently alter risk decisioning, authentication processes, and any other transaction processes based on the authentication results provided by the payment processing network 160.

Additionally, by interfacing with the payment processing network 160, the payment processing network 160 may allow an additional layer of transaction authentication by generating an authorization response value that may be validated by a payment processing network 160 before a transaction is authorized. Furthermore, by interfacing with the payment processing network 160, a remote key manager 140 may act as a single interface point with an authentication system that allows for efficient authentication of a user and a device associated with the remote transaction. Dual authentication is particularly important for remote payment transactions due to the remote nature and lack of an ability to authenticate a consumer 110 by a merchant or other in-person service provider.

At step 601, a consumer 110 finishes their shopping experience through a merchant application 121 of a communication device that communicates with a merchant computer 130 or other computer that is hosting an online or e-commerce store. The consumer 110 may initiate a checkout process through the merchant application 121 of the communication device (e.g., mobile device 120). The merchant application 121 may provide an option for a remote payment transaction using a remote transaction application 124 and the consumer 110 may select the remote transaction application 124 as a checkout option. Accordingly, the consumer 110 initiates a remote payment transaction using the merchant application 121 and the merchant application 121 sends a message to the merchant computer 130 indicating that the consumer 110 would like to initiate a remote transaction.

In some embodiments, the merchant application 121 may provide an option to select a payment card or account for payment through a remote transaction application 124. Accordingly, in some embodiments, the remote transaction application 124 may have previously determined the available cards or accounts available for remote payment transactions and may communicate the available account information to the merchant application 121. Alternatively or additionally, the merchant application 121 may request the available accounts when preparing for checkout or at any other suitable time. Accordingly, in some embodiments, the consumer 110 may select an account when initiating a remote payment through the merchant application 121. In other embodiments, a default account may be used or the remote transaction application 124 may prompt the consumer 110 to select an account at a later time.

At step 602, the merchant computer 130 receives the indication of the remote transaction initiation and responds by generating and sending transaction information for the remote payment transaction to the merchant application 121 of the mobile device 120. The transaction information may include, for example, a merchant identifier, a transaction amount, an authentication type for the transaction, a transaction identifier, a merchant certificate, and any other relevant information for processing the remote transaction.

Additionally, in some embodiments, the transaction information may have previously been provided to the merchant application 121 when the checkout options were provided to the user. Either way, the merchant application 121 may have access to transaction information associated with a remote transaction.

At step 603, the merchant application 121 sends payee information to a remote transaction application 124 using a remote transaction software development kit (SDK), a remote transaction service layer, a remote transaction application 124 application programming interface (API), or any other application located on the mobile device 120. Payee information may include information suitable to identify a merchant associated with the remote payment transaction (e.g., a merchant certificate, a merchant identifier associated with the mobile payment application 123, etc.), user payment method (e.g., payment credentials associated with the mobile payment application 123), a type of transaction (e.g., a remote transaction), and any other information that may be relevant to the mobile payment application 123 for processing the remote payment transaction.

For example, the payee information may include a merchant certificate associated with the merchant application 121 or the merchant computer 130. Additionally or alternatively, the payee information may include a merchant identifier that may be used to determine a merchant certificate associated with the merchant application 121 or the merchant computer 130 that is stored in the mobile payment application 123.

Further, the payee information may include a merchant identifier that was provided to the merchant application 121 (or a merchant server associated with the merchant application 121) during a registration phase for the remote transaction processing service or the remote key manager 140. In some embodiments, the payee information may be used to identify a merchant certificate in which to provide to the remote key manager 140 (e.g., for embodiments where the mobile payment application 123 passes the merchant certificate to the remote key manager 140).

Additionally, the payee information may include a type of transaction identifier informing the mobile payment application 123 that the request is associated with a remote payment transaction. Accordingly, the mobile payment application 123 may select the appropriate encryption key in which to encrypt the payment information (e.g., remote key manager key), the appropriate destination or routing address for the remote key manager 140, and the correct communication protocol or message format for communicating with the remote key manager 140.

Finally, the payee information may include a user's name, a payment processing network identifier associated with the payment method (e.g., Visa™, MasterCard™, etc.), and the last four digits an account number in order for the mobile payment application 123 to identify payment credentials or account information in which to use for the remote payment transaction.

In some embodiments, some or all of this information may be determined and provided by the merchant application 121 instead of the remote transaction application 124. For example, where the merchant application 121 has embedded APIs or other software for interacting with the mobile payment application 123 or may otherwise be configured to interact directly with the mobile payment application 123, the merchant application 121 may pass the remote transaction information (e.g., payee information, merchant certificate, transaction information, etc.) to the mobile payment application 123. Either way, the remote transaction application 124 may receive transaction information, payee information, and/or a selection of an account for use in the remote transaction.

At step 604, the remote transaction application 124 performs validation controls and otherwise ensures the received transaction information qualifies for remote transaction processing. For example, the remote transaction application 124 may determine whether the selected account is configured to allow for remote transactions or if the corresponding payment processing network 160 is configured to allow remote transactions. Additionally, the remote transaction application 124 may validate the merchant certificate received from the merchant application 121 and may determine whether the merchant certificate can be validated using a certificate authority root public key. Further, the remote transaction application 124 may ensure that the transaction information matches transaction constraints (e.g., maximum transaction amount, under a maximum velocity or frequency of transactions in a designated period, etc.).

Furthermore, the remote transaction application 124 may ask for a user to authenticate and validate their identity to the remote transaction application 124 before allowing access to the mobile payment application 123. For example, the remote transaction application 124 may request the user provide user authentication data (e.g., a shared secret, passcode, etc.) associated with the remote transaction application 124 and/or the issuer of the account. If the user does not provide the user authentication data or if the user authentication data does not fit a particular format or type of information (e.g., use of symbols that are not allowed or too many digits, etc.) expected of the remote transaction application 124, the remote transaction application 124 may not allow the transaction to proceed. Any additional verification controls may be implemented in order to limit access to the mobile payment application 123.

At step 605, if the transaction qualifies for further remote transaction processing, the remote transaction application 124 may communicate the payee information to the mobile payment application 123 of the secure element 122. The remote transaction application 124 may use APIs or other commands configured to be used to communicate with the mobile payment application 123 in order to request that the mobile payment application 123 (e.g., Visa™ Paywave™ application) provide provisioned payment credentials (e.g., a primary account number (PAN), payment token, pseudo-PAN, obfuscated PAN, ghost PAN, expiration date, etc.) that are stored on the secure element 122 in a secure manner.

In some embodiments, the remote transaction application 124 may forward the transaction information to the mobile payment application 123. However, in other embodiments, the transaction information may be stored or held at the remote transaction application 124 while payment credentials are retrieved from the mobile payment application 123. Further, in some embodiments, the transaction information may be previously encrypted with a payment processing network specific key by the merchant computer 130. In such embodiments, the merchant application 121, the remote transaction application 124, and the mobile payment application 123 may not alter or change the transaction information and may pass the previously encrypted transaction information along with the encrypted payment information received from the mobile payment application 123 to the remote key manager 140.

In other embodiments the transaction information may not have been previously encrypted and may be passed to the mobile payment application 123 to be encrypted and included in the encrypted payment information returned from the mobile payment application 123. Further, in some embodiments, the transaction information may not be encrypted and may be included with the encrypted payment information in an unencrypted form.

At step 606, mobile payment application 123 uses the received payee information to retrieve and/or generate payment information from the secure element 122 of the mobile device 120. "Payment information" may include payment credentials (e.g., a payment account number (PAN) or token), an expiration date, a unique transaction identifier (e.g., nonce), a security value (such as a static or dynamic card verification value (dCVV or dCVV2), a cryptogram (e.g., ARQC), or other secure data associated with a shared secret between the mobile payment application 123 and a payment processing network 160 and/or account issuer), a security level indicator (e.g., ECI5 value), or any other information suitable to conduct a remote payment transaction. Accordingly, the mobile payment application 123 may generate security information including a security value that is generated using a shared algorithm associated with an account issuer. Payment information may further include any transaction information that may be useful in processing the transaction (e.g., amount, merchant identifier, etc.).

After generating the payment information associated with the payment information, the mobile payment application 123 encrypts the payment information using a key associated with the remote key manager 140. For example, the mobile payment application 123 may encrypt the payment information using a remote key manager key or other encryption key stored at the mobile payment application 123. The remote key manager key may be either symmetric or a public key associated with a remote key manager public/private key pair. In some embodiments, mobile payment application 123 may determine the remote key manager public key using a remote key manager certificate stored on mobile device 120, may request a certificate from the remote key manager 140, or may obtain the remote key manager public key on the secure element 122 or general memory of the mobile device 120. Where the remote key manager key is a symmetric key, the symmetric key may be stored securely with the mobile payment application 123. Accordingly, the encrypted payment information is generated by a payment application of the communication device by accessing payment credentials stored in a secure memory of the communication device.

At step 607, the mobile payment application 123 sends the payment information (either encrypted or not) to the remote transaction application 124. The remote transaction application 124 receives the encrypted or unencrypted payment information, encrypts the payment information if not already encrypted, and generates a payment request including the encrypted payment information, a merchant certificate associated with the merchant computer 130, and any other transaction data associated with the payment transaction that was not included in the encrypted payment information (e.g., transaction amount, merchant identifier, product identifiers, etc.).

If the payment information is not yet encrypted, the remote transaction application 124 encrypts the payment information using an encryption key associated with a remote key manager 140. For example, in some embodiments, the remote transaction application 124 may establish a secure channel with a remote key manager 140 using one or more keys to securely communicate sensitive information to the remote key manager 140. For example, the remote transaction application 124 may receive a key from the mobile payment application 123 in which to encrypt the payment information in order to create a secure channel with the remote key manager 140. Additionally, in some embodiments, the remote transaction application 124 may store the remote key manager encryption key and may encrypt the payment information and any other information in the payment request using the remote key manager encryption key.

At step 608, the remote transaction application 124 may then transmit the payment request including the encrypted payment information, merchant certificate, and any transaction information to the remote key manager 140. The encrypted payment information may include security information including the user authentication data (e.g., PIN, passcode, etc.) and the security value generated by the mobile payment application. Although not shown in FIG. 6, in some embodiments, the remote transaction application 124 may initiate and generate a secure channel with the remote key manager 140 and may use session keys associated with the secure channel to communicate the payment request to the remote key manager 140. In such embodiments, the secure channel may be established using a session derived key associated with a master derived key that may be shared between the remote key manager 140 and the secure element of the communication device (e.g., through the remote transaction application 124 or the mobile payment application 123). In such embodiments, the session keys may be used to send the payment request as well as receive a payment response from the remote key manager 140.

Accordingly, the communication device (e.g., mobile device 120) may send a secure communication including user authentication data for validating a user associated with the transaction (e.g., passcode, PIN, etc.), security values for validating a device associated with the transaction (e.g., mobile payment application cryptogram), and secure payment credentials and/or transaction data for processing the remote transaction, to a single entity that is configured to complete an authentication process associated with an account issuer for both the user and the device for the remote payment transaction as well as determine secure keys associated with a merchant for processing the transaction after authentication in a single step. This is advantageous as typically such authentication processes required multiple separate processes and redirection to an authentication computer for direct communication between the communication device and the authentication computer or issuer system. Accordingly, the remote key manager provides a simple and efficient integration point for authentication and secure processing of remote transactions initiated by a communication device.

At step 609, the transaction processing module 141(C) of the remote key manager 140 receives the payment request and decrypts the encrypted payment information using a corresponding encryption key stored at a private key database 141(G) of the remote key manager 140 (e.g., private key, corresponding symmetric key, session key, etc.). Accordingly, the remote key manager server computer may decrypt the encrypted payment information using a second encryption key (e.g., remote key manager private key) associated with the first encryption key (e.g., remote key manager public key) used to encrypt the encrypted payment information on the communication device. Accordingly, the remote key manager 140 may obtain decrypted security information including the user authentication data (e.g., PIN, passcode, etc.) and the security value (e.g., cryptogram) generated by the mobile payment application 123 for the remote transaction as well as payment credentials, transaction information, etc.

The remote key manager private key stored at the private key database 141(G) may include any suitable encryption key including, for example, a symmetric encryption key or a private key of a public/private key pair. In embodiments using a remote key manager private key, the private key is configured to decrypt information that has been encrypted with a corresponding remote key manager public key and the remote key manager private key is stored securely at the remote key manager 140 so that the remote key manager 140 may be capable of decrypting information encrypted with the remote key manager public key. Similarly, a remote key manager symmetric key may be stored at the remote key manager 140 and used to decrypt the encrypted payment information.

The certificate verification module 141(A) of the remote key manager 140 may also validate the merchant certificate received in the payment request as being authentic by applying a certificate authority root public key stored in a certificate authority public root key database 141(H) to validate that the public key certificate (e.g., merchant certificate) is legitimate and signed by an appropriate certificate authority 180. The certificate verification module 141(A) may then extract the merchant public key included in the merchant certificate for use in further processing the remote transaction.

Further, in embodiments where the transaction data received at the merchant application 121 was signed by a merchant computer 130, the remote key manager 140 may validate the received payment request by checking to ensure that the correct merchant public key was used to encrypt the transaction information (e.g., the merchant public key is associated with the received merchant certificate), that aspects of the payment information are correct (e.g., that the merchant identifier is associated with a registered merchant), and may perform any other suitable validation that may ensure the payment request including the encrypted payment information is being sent by a legitimate payment application, merchant computer 130, merchant application 121, communication device (e.g., mobile device 120), etc.

For example, in some embodiments, the remote key manager 140 may validate a signature on any transaction data (if signed by the merchant computer 130 or corresponding transaction processor with the received public key certificate). Typically, the signature may be validated using the public key included in the merchant certificate by extracting the merchant computer public key from the merchant certificate. Alternatively, in some embodiments, the public key may be registered and stored at the remote key manager 140 as being associated with the merchant certificate. If the signature is not validated, then the remote key manager 140 indicates to the merchant application 121 that the signature is invalid, and the method halts. Note that the merchant computer 130 signing the transaction information as well as validating the signature by the remote key manager 140 are optional and may not occur at all or may occur on a periodic basis and thus, the signature may not be passed from the merchant computer 130.

At step 610, the security information validation module 141(D) of the remote key manager 140 may obtain an authentication response value for the remote transaction by initiating an authentication process with an authentication computer 191. As described above, the security information validation module 141(D) of the remote key manager 140 may obtain an authentication response value through different methods. For example, for the embodiment shown in FIG. 6, a security information validation module 141(D) of the remote key manager 140 may generate and send an authentication request to a payment processing network 160. The authentication request may include the decrypted security information including the user authentication data (e.g., PIN, passcode, etc.) and the security value (e.g., cryptogram) generated by the mobile payment application for the remote transaction as well as payment credentials, transaction information, and any other relevant information for validating the authentication request.

In some embodiments (not shown), the remote key manager 140 may be associated with or part of a payment processing network 160 and may obtain the authentication response value by determining an authentication computer 191 associated with the decrypted payment information and sending an authentication request including the security information to an authentication computer directly. For example, the remote key manager 140 functionality may be embedded into a payment processing network 160 and the remote key manager 140 may have access to the directory server database without sending an authentication request to a payment processing network 160. However, for the embodiment shown in FIG. 6, the remote key manager 140 may send the authentication request to the payment processing network 160 in order to authenticate the user and the device associated with the remote payment transaction.

At step 611, the security information validation module 161(D) of the payment processing network 160 receives the authentication request message and determines an authentication computer 191 associated with the authentication request. Depending on the configuration of the payment processing network 160, the security information validation module 161(D) of the payment processing network 160 may determine an authentication computer 191 associated with the authentication request through multiple different processes. For example, the security information validation module 161(D) may determine the authentication computer 191 directly by using directory server functionality imbedded into the payment processing network 160, by requesting the identity of the authentication computer 191 from a directory server computer 190, or by forwarding the authentication request to the directory server through the directory server interface module 161(C).

In the embodiment shown in FIG. 6, the security information validation module 161(D) of the payment processing network server computer 161 may pass the authentication request to the directory server computer 190 and the directory server computer 190 may determine the identity of the authentication computer 191 associated with the authentication request and pass the authentication request to the authentication computer 191. Accordingly, at step 611, the payment processing network may forward the authentication request to the directory server computer 190 for determination and identification of the authentication computer 191 for the authentication request. Accordingly, the payment processing network server computer 161 may send the decrypted security information including the user authentication data (e.g., PIN, passcode, etc.) and the security value (e.g., cryptogram) generated by the mobile payment application for the remote transaction as well as payment credentials, transaction information, and any other relevant information for validating the authentication request to the directory server computer 190.

However, in other embodiments (not shown), the payment processing network server computer 161 may incorporate the functionality of the directory server computer 190 and thus may determine the authentication computer 191 directly. Accordingly, the security information validation module 161(D) of the payment processing network 160 may determine the identity of authentication computer 191 associated with the authentication request and thereafter, the payment processing network computer 161 may forward the authentication request to the authentication computer 191. The security information validation module 161(D) of the payment processing network 160 may determine the identity of the authentication computer 191 by determining the account issuer associated with the authentication request and searching an issuer authentication configuration database 161(E) for an authentication computer 191 associated with the account issuer.

For example, the authentication request may include decrypted payment information including an account identifier (e.g., PAN) associated with the remote payment application. The security information validation module 161(D) of the payment processing network 160 may determine the account issuer associated with the account information (e.g., by extracting the issuer identifier (e.g., BIN) from the account identifier (e.g., PAN) and search the account issuer authentication configuration database 161(E) for the authentication computer 191 configured to process authentication requests associated with the determined issuer and/or determined account range associated with the account information (e.g., for issuers with different authentication computers associated with different types of accounts or account ranges, etc.).

Furthermore, in some embodiments, more than one authentication computer 191 may be identified for a single authentication request. For example, a first authentication computer 191 associated with a payment processing network 160 may be identified for on-behalf-of authentication of a security value generated by the mobile payment application 123 while a second authentication computer 191 associated with an account issuer may be identified for validation of user authentication data. Accordingly, the security information validation module 161(D) may send the authentication request to both authentication computers configured to complete the authentication of each particular type of security information.

Accordingly, the security information validation module 161(D) of the payment processing network 160 may perform security value authentication on-behalf-of the account issuer by searching an issuer shared secret database 161(F) for a shared secret associated with the issuer, the account, or the mobile payment application 123 used to generate the security value. The shared secret may include an algorithm, a look-up table, or any other information associated with an account, device, and/or mobile payment application 123 provided by the account issuer during provisioning of the account on the secure element 122 of the communication device. Additionally or alternatively, a master shared secret key may be provided by the account issuer that may be used to generate a derived shared secret key for each account associated with the issuer. Either way, the security information validation module 161(D) of the payment processing network 160 may retrieve the appropriate shared secret associated with the authentication request, determine a security value for the authentication request, and compare the determined security value to the received security value to validate the mobile payment application 123 as authentic and verified.

The security value may be determined through any suitable method depending on the type of shared secret associated with the authentication request. For example, where the security value is dynamic, the security information validation module 161(D) may retrieve a shared secret algorithm from the issuer shared secret database 161(F) and apply received input data from the authentication request to the shared secret algorithm. For example, the last four digits of a PAN, an expiration data, and a nonce (i.e., unpredictable value received from the mobile payment application 123) may be applied to the determined shared secret algorithm in order to generate a security value for the authentication request.

In embodiments where the security value is static, the security information validation module 161(D) may search the issuer shared secret database 161(F) for a static shared secret associated with the account, issuer, mobile payment application 123, user, or any other variable associated with the shared secret database. For example, if the shared secret is a static card verification value (CVV), the security information validation module may search the issuer shared secret database 161(F) for an entry associated with the PAN and may determine the static CVV associated with the issued card and/or account. Accordingly, any suitable methods may be used to determine and validate a security value by the payment processing network 160 or authentication computer 191.

However, as shown in FIG. 1, in some embodiments the payment processing network 160 may forward the authentication request to a directory server which may determine the relevant authentication computer 191 associated with the authentication request. Alternatively, the payment processing network 160 may request the identity of the authentication computer 191 from the directory server computer 190 and then send the authentication request to the authentication computer 191. The directory server computer 190 may perform similar processes to those described above regarding identifying an authentication computer 191 associated with the authentication request.

At step 612, the directory server computer 190 may receive the authentication request including the decrypted security information. The decrypted security information may include the user authentication data (e.g., PIN, passcode, etc.) and the security value (e.g., cryptogram) generated by the mobile payment application for the remote transaction as well as payment credentials, transaction information, and any other relevant information for validating the authentication request. The directory server computer 190 may determine the authentication computer associated with the authentication request through the same processes described above in reference to the payment processing network 160, including, for example, determining an issuer identifier (e.g., BIN) associated with the payment credentials in the authentication request and searching an issuer authentication configuration database or any other database comprising authentication computer addresses and account issuer associations for an authentication computer 191 associated with the determined issuer identifier (e.g., BIN).

Once the directory server computer 190 determines the authentication computer 191 associated with the authentication request, the directory server computer 190 may forward the authentication request to the determined authentication computer 191. Note that the received authentication request from the payment processing network server computer 161 and the forwarded authentication request to the authentication computer 191 may be received and sent over an encrypted communication channel such that the authentication request and the included security information is protected and secured against interception by malicious third parties. Each communication between the various entities in the encryption process (e.g., steps 610-616) may be encrypted and decrypted using any suitable encryption keys such that the encryption process at each step is secured against interception.

At step 613, the authentication computer 191 may receive the authentication request including the security information and may validate the security information and generate an authentication response including an authentication response value. As described above, the authentication computer 191 may be operated by an account issuer, by a payment processing network 160 on-behalf-of the account issuer, or by a third party system.

The authentication computer 191 may validate the security information in the authentication request by validating user authentication data input by a user and/or a security value generated by a payment application (e.g., mobile payment application 123) against user authentication data and security validation information stored at an authentication database. For example, the authentication database may store shared secrets provided to a mobile payment application 123 of the communication device as well as user authentication data stored by an account issuer during a registration process or other account verification with a user.

An authentication computer 191 may validate a security value through the same processes described above regarding the payment processing network server computer's validation of the security values. Accordingly, the authentication database may store shared secret algorithms, look-up tables, or any other verifiable information that may be used to determine a security value for an account, and compare the determined security value to a received security value in an authentication request. If the security values are the same, the authentication request may be validated as being originated from an authentic communication device, mobile payment application 123, and/or remote transaction application 124.

For example, a validation security value (e.g., cryptogram) may be generated by the payment processing network 160 using transaction information and/or payment information received in the authentication request. If the received cryptogram matches the generated validation cryptogram, the authentication computer 191 may verify that the payment information was generated by a valid and authentic mobile payment application 123.

An authentication computer 191 may validate user authentication data (e.g., PIN, passcode, etc.) similarly to the security value validation. Accordingly, the authentication database may store user authentication data (e.g., PIN, passcode, etc.) associated with consumer accounts in the authentication database that may be used to determine stored user authentication data for an account, and may compare the determined user authentication data to the received user authentication data in an authentication request. If the authentication data is the same or matches within a reasonable threshold, the authentication request may be validated as being associated or initiated with an authorized user or account holder.

For example, a user authentication input (e.g., passcode) may be entered by a user during initiation of the remote payment transaction. The passcode may be passed in the encrypted payment information to the remote key manager 140 which may include the user authentication data (e.g., passcode) in an authentication request sent through a payment processing network 160 to an authentication computer 191 associated with an account issuer of the user's account. The authentication computer 191 may find stored user authentication data (e.g., passcodes) stored in an authentication database associated with the user's account and may compare and validate that the stored user authentication data (e.g., passcode) matches the received user authentication data (e.g., passcode).

Alternatively or in combination, the authentication computer 191 may determine whether the mobile payment application 123, remote transaction application 124, payment processing network 160, and/or other trusted entity previously authenticated the consumer 110 and may use this information to determine whether to perform consumer authentication processes and whether the authentication request is authenticated. For example, in some embodiments, the issuer may provision shared secret information associated with the consumer account to the personalized mobile payment application 123 or remote transaction application 124 in the secure element 122. Accordingly, the mobile payment application 123 or remote transaction application 124 may validate received user authentication data (e.g., passcode) against the provisioned user authentication data (e.g., passcode) and determine whether the user is authentic. If the user authentication data matches (and thus the consumer is authenticated), an indication of the results of the authentication (e.g., user authenticated) may be provided in the payment request generated and sent to the remote key manager 140 and subsequently included in the authentication request that is forwarded to the authentication computer 191.

Accordingly, the authentication computer 191 may determine whether the user was previously authenticated, by what entity or application, whether additional authentication may be performed, and the authentication computer 191 may control the authentication decision associated with the authentication request. Therefore, in some embodiments, security information including cardholder verification methods performed by a mobile payment application 123 or remote transaction application 124 before the transaction is initiated may be passed to the payment processing network computer 161, the directory server computer 190, and the authentication computer 191 and used in authenticating the remote transaction.

Additionally, the authentication request may be further authenticated using any number of internal or external authentication processes. For example, a risk based, stored credential, challenge-response, or any other type of consumer authentication process may be completed. In some embodiments, the remote key manager 140 may request authentication information from the consumer 110 through an authentication request, a challenge, a request for a password, or through any other suitable method.

If the authentication processes are successful and the security information is validated, the authentication computer 191 may generate an authentication response value (e.g., validation cryptogram) for the transaction using a shared secret authentication response algorithm associated the account issuer computer 170 and/or the payment processing network 160. The authentication response value may be validated by the account issuer computer 170 or the payment processing network 160 during authorization processing in order to provide an additional level of authentication for the transaction by indicating that the transaction was previously analyzed and authenticated by the authentication computer 191. Additionally, a security level indicator may be altered or provided in the authentication response that indicates to other entities within the transaction processing eco-system that the transaction has been authenticated using two factor user and device security information. The security level indicator may allow other entities in the transaction to change their behavior in any number of different manners and may indicate to the other entities which party holds the liability for the transaction (e.g., payment processing network instead of merchant, etc.).

At step 614, the authentication computer 191 may generate and return an authentication response including the authentication response value, an increased security level indicator, and/or an indication of the success of the authentication processors to the directory server computer 190 or the payment processing network 160 (depending on the configuration of the system). Alternatively, if the authentication processes are not successful, an error or other denial may be returned and the transaction may be halted.

At step 615, the directory server computer 190 may receive the authentication response and forward the authentication response to the payment processing network server computer. The authentication response may include the authentication response value, the security level indicator, and the indication of success (as well as any of the security information, transaction information, payment credentials, etc.). Note that the communications may be encrypted between each entity to ensure security and an end-to-end encryption process.

At step 616, the payment processing network server computer 161 may receive the authentication response message, determine the remote key manager 140 associated with the authentication response message, and send the authentication response message to the remote key manager 140. The authentication response may include the authentication response value, the security level indicator, and the indication of success (as well as any of the security information, transaction information, payment credentials, etc.). Note that the communications may be encrypted between each entity to ensure security and an end-to-end encryption process.

At step 617, the remote key manager 140 may receive the authentication response from the payment processing network 160 and may determine the results of the authentication processes. Accordingly, if the authentication processes were successful and the remote key manager 140 receives an authentication response including the authentication response value (e.g., validation cryptogram) indicating validation of the security information by an authentication computer 191 associated with an account issuer and/or a payment processing network 160, the remote key manager 140 may continue the remote transaction processing.

Accordingly the remote key manager 140 may update the decrypted payment information to include the authentication response value, the security indicator, and any other validation information from the authentication response. In some embodiments, the security information may be replaced with the authentication response value and/or the security indicator. In other embodiments, the authentication response value and security indicator may be appended or added to the decrypted payment information.

The public key extraction module 141(B) of the remote key manager 140 may extract a public key from the merchant certificate (or other transaction processor certificate) if the remote key manager 140 has not already extracted the merchant public key. The transaction processing module 141(C) of the remote key manager 140 may then re-encrypt the payment information using the determined merchant public key. As explained above, the merchant public key may be included in the merchant application certificate and extracted at any point during the remote transaction processing. The remote key manager 140 may determine the merchant public key in any suitable manner including extracting the public key from the merchant certificate, using a stored merchant public key for merchants registered with the remote key manager 140, or through any other suitable manner.

At step 618, the transaction processing module 141(C) of the remote key manager 140 generates and sends a payment response to the communication device (e.g., mobile device 120) including the re-encrypted payment information. The payment response may be sent through the secure channel previously used to receive the payment request or the encrypted payment information may be sent through an open channel to the remote transaction application 124 of the mobile device 120. Accordingly, in some embodiments, the re-encrypted payment information may be further encrypted using the previously established session key for secure communication between the remote key manager 140 and the mobile device 120.

At step 619, the remote transaction application 124 receives the re-encrypted transaction response and forwards the re-encrypted payment information in the transaction response to the merchant application 121. Any number of different methods may be used to send the re-encrypted payment information to the merchant computer 130. For example, the payment response message may include unencrypted routing information associated with the merchant computer 130 such that the merchant application 121 may automatically route the re-encrypted payment information to the merchant computer 130. Alternatively or additionally, the merchant application 121 may have the routing information (e.g., server computer address) associated with merchant computer 130 programmed into the merchant application 121 and when the transaction is initiated, the merchant application 121 may know that any respective payment response message may be routed to the merchant computer 130. Further, a flag or other data element in a message received including the re-encrypted payment information may indicate to the merchant application 121 as to where and in which entity to send the re-encrypted payment information.

Additionally, in some embodiments, the remote key manager 140 140 may be configured to send the payment response directly to the merchant computer 130. Accordingly, the remote key manager 140 may use address information included in the merchant certificate, merchant information provided during registration for the remote payment processing service, or merchant information provided in the purchase request to determine the appropriate merchant server computer in which to send the purchase response directly.

At step 620, the merchant application 121 sends the re-encrypted payment information to the merchant computer 130. The merchant application 121 may determine the appropriate merchant computer 130 in which to send the re-encrypted payment information through any suitable method. For example, routing information may be included in the payment response, the merchant application 121 may have a destination merchant computer 130 associated with the remote payment transaction when the payment is initiated, or the merchant application 121 may have a designated merchant computer 130 in which to send the payment response.

At step 621, the merchant computer 130 receives the re-encrypted payment information and decrypts the re-encrypted payment information using the merchant private key stored at the merchant computer 130. Thus, for the first time in the remote transaction processing, the merchant computer 130 may gain access to the payment information (e.g., payment credentials and/or other secure information including the authentication response value) that the mobile payment application 123 123 obtained and encrypted from the secure memory of the mobile communication device. For example, the merchant server may obtain an account identifier (e.g., a primary account number (PAN)) and an expiration date associated with a payment account as well as a transaction specific security value and authentication response value. The authentication response value (e.g., a card authentication verification value (CAVV)) provides additional authentication and validation opportunities for the payment processor and/or issuer and allows for minimized risk of fraud in remote transactions. Accordingly, the merchant server computer now has the secure payment credentials, the authentication response value (e.g., CAVV), a security level indicator and/or a liability indicator, transaction information, and any other relevant information for initiating a payment transaction.

Accordingly, the merchant computer 130 may use the decrypted payment information to initiate and/or conduct a payment transaction. For example, merchant computer 130 may generate an authorization request message including information that would typically be present in "card-present" transactions (e.g., payment credentials, security values, etc.) as well as the addition of an authentication response value indicating that the consumer 110 has been previously authenticated with the transaction. Accordingly, the merchant computer 130 may map the decrypted payment information (as well as the other transaction information included in the payment response) to the format associated with an authorization request message of the merchant computer 130, acquirer computer 150, payment processing network 160, and issuer computer 170.

At step 622, the merchant computer 130 may initiate the payment transaction by sending the authorization request message to an acquirer computer 150 associated with the merchant computer 130. The authentication request message may have the decrypted payment information mapped to predetermined fields within the authorization request message in order to allow transaction entities (e.g., acquirer computer 150, payment processing network 160, issuer computer 170, etc.) within the transaction ecosystem to identify payment credentials (e.g., an account) and an authentication level associated with the transaction and to process the transaction.

At step 623, the acquirer computer 150 may route the authorization request message to a payment processing network 160 associated with the issuer identifier (e.g., a BIN) or account identifier (e.g., primary account identifier) provided in the authorization request message.

At step 624, the payment processing network 160 may receive the authorization request message and may validate the authentication response value in the authorization request message. The payment processing network 160 may parse the authorization request message to determine the authentication response value and may access a authentication response shared secret algorithm or other encryption key that may be used to validate that authentication response value received in the authentication request message. For example, the authentication response value shard secret algorithm may include a remote key manager key, account issuer key, or payment processing network key used to generate the authentication response value in order to generate a validation authentication value. If the validation authentication value and the authentication response value match, the payment processing network 160 may know that the transaction was previously authenticated and determine that the likelihood that this transaction is fraudulent is low. Accordingly, the transaction may be immediately authorized or additional authentication information may be provided to an issuer to inform them that the transaction is likely authentic and should be authorized.

Alternatively or additionally, the authentication response value may be authenticated by an issuer computer 170 using an issuer shared secret key that was used by the authentication computer 191 to generate the authentication response value through a similar validation process to that described above. Accordingly, the authentication response value may be validated by a payment processing network 160 or an account issuer computer 170 after initiation of the payment transaction and during processing of the payment transaction.

At step 625, the payment processing network 160 forwards the authorization request message to an issuer computer 170 associated with the consumer account.

At step 626, the issuer computer 170 may perform a risk assessment and authorization decisioning process where the issuer computer 170 may parse the relevant information from the authorization request message including the authentication response value, any validation information from the payment processing network 160 related to the transaction (e.g., a risk score, results of other authentication processes, etc.) and may make a decision regarding whether the transaction is authorized.

At step 627, the issuer computer 170 may then generate and return an authorization response message including an indication as to whether the transaction is authorized back through the payment network and ultimately (although not shown) to the merchant computer 130 and the consumer 110 (through the mobile device 120) as to whether the transaction is authorized and is successfully completed.

It should be understood that FIG. 6 is intended to be descriptive and non-limiting. For example, any number of different entities may be used to decrypt the re-encrypted payment information (e.g., mobile gateway, mobile wallet provider, payment processing network, etc.). Additionally, other transaction processing entities (e.g., the merchant application 121, the acquirer computer 150, a payment service provider, etc.) may also be configured to decrypt the re-encrypted payment information and initiate a payment transaction.

II. Additional Embodiments

Additionally, although FIG. 6 shows a merchant computer 130 initiating the payment transaction by decrypting the re-encrypted payment information and mapping the decrypted payment information to an authorization request message, additional exemplary methods for conducting a remote transaction using a remote key manager 140 and a merchant application 121 of a mobile device 120 may be completed based on the identity of the transaction processor associated with the remote payment transaction. For example, a transaction processor certificate may be used to determine the transaction processor associated with decrypting the re-encrypted payment information and initiating a remote transaction. For instance, the remote key manager 140 may re-encrypt the payment information using a public key associated with multiple different transaction processing entities (e.g., merchant application 121, merchant computer 130, acquirer computer 150, payment service provider (PSP), etc.). Accordingly, the transaction processor may change depending on the certificate passed during transaction processing and the configuration of the system.

For instance, instead of using a merchant public key to encrypt the payment information, a merchant application public key (associated with a private key stored at the merchant application 121) or an acquirer public key (associated with a private key stored at an acquirer computer 150) may be used to encrypt the payment information and the re-encrypted payment information may be passed to each respective entity (e.g., merchant server computer or acquirer computer 150) for decrypting and authorization request message generation. Accordingly, depending on the configuration of the remote transaction processing system, in some embodiments, any number of public key certificates (e.g., merchant application public key certificate, merchant public key certificate, acquirer public key certificate, etc.) may be passed to the remote key manager 140. The merchant application 121 may determine which public key certificate should be provided as well as routing information for the encrypted payment information once the re-encrypted payment information is returned from the remote key manager 140.

Accordingly, the identity of the transaction processor certificate may include any of the merchant application 121, the merchant computer 130, or the acquirer computer 150.

Therefore, the remote key manager 140 may validate the received public key certificate, decrypt the encrypted payment information (e.g., account identifier and cryptogram), and re-encrypt the decrypted payment information (e.g., card data and cryptogram), with the public key extracted from the received public key certificate. As explained above, the public key certificate may be associated with any transaction processor including, for example, a merchant computer 130, merchant application 121, or an acquirer computer 150. Thereafter, the remote key manager 140 may send the re-encrypted payment information to a transaction processing entity (e.g., a merchant application 121, merchant computer 130, acquirer computer 150, etc.) associated with the received public key certificate (and subsequently the public key used to encrypt the payment information).

For example, in a first embodiment, the public key certificate may include a merchant application public key certificate so the remote key manager 140 validates the certificate and extracts or otherwise obtains the merchant application public key. Accordingly, the merchant application public key is used to re-encrypt the decrypted payment information and the remote key manager 140 sends the re-encrypted payment information to the merchant application 121. The merchant application 121 may receive the re-encrypted payment information, determine a merchant application private key associated with the re-encrypted payment information, and decrypt the re-encrypted payment information using the merchant application private key. Accordingly, the merchant application 121 may have the sensitive information that was stored on the secure element 122 as well as secure information that was generated using the secure algorithms of the mobile payment application 123 for the payment transaction.

The merchant application 121 may then initiate a payment transaction using the decrypted payment information. The merchant application 121 may initiate the payment transaction using any suitable method. For example, the merchant application 121 may generate an authorization request message configured to be sent through a payment processing network 160. Alternatively, although not shown in FIG. 6, the merchant application 121 may encrypt the decrypted payment information again using a merchant server key and may send the payment information to the merchant computer 130 for decryption and initiation of the payment transaction. As such, the decrypted payment information may be passed to a merchant computer 130 for generation of an authorization request message or other initiation of a payment transaction. Similar processes may be applied to any other transaction processors (e.g., acquirer computers, payment service provider systems, etc.).

Additionally, in some embodiments, the remote key manager may include a mobile gateway to a payment processing network 160 and the payment processing network 160 may perform all of the functionality of the remote key manager 140 and the payment processing network 160 described above. Accordingly, the mobile device 120 may communicate the encrypted payment information of the payment request directly to the payment processing network 160 that is configured to process the remote payment transaction. Accordingly, the remote key manager 140 and the encryption keys used to communicate between the mobile payment application 123 and the remote key manager 140 may be associated with the payment processing network 160.

The mobile gateway (not shown) may include a secure channel generation module that is configured to configure a secure communication link between the mobile gateway, a mobile device 120, and a payment processing network computer 161. The secure channel generation module may exchange any relevant information in order for the mobile payment application 123 and the mobile gateway to generate matching or complimentary session keys for securely communicating sensitive information. Any other suitable method for generating a secure channel may be implemented.

Further information regarding the capabilities of the mobile gateway may be found in U.S. application Ser. No. 13/662,843, filed Oct. 29, 2012, titled "Over The Air Update of Payment Transaction Data Stored in Secure Memory," U.S. application Ser. No. 12/563,410, filed Sep. 21, 2009, titled "Apparatus and Method for Preventing Unauthorized Access to Payment Application Installed in Contactless Payment Device," and U.S. application Ser. No. 13/563,421, filed Sep. 21, 2009, titled "Over The Air Update of Payment Transaction Data Stored in Secure Memory," which are hereby incorporated by reference in their entirety, for all purposes.

In embodiments with a mobile gateway, a secure channel may be established and communications may be sent between the mobile payment application 123, the mobile gateway associated with the payment processing network 160, and the payment processing network computer 161 in order to initialize and prepare the secure channel. The secure channel allows for future communications between the mobile device 120 and payment processing network 160 to be encrypted and secured from interception.

The secure channel may be established in any suitable manner. For example, the secure channel may be established using a mobile gateway encryption key provisioned into the mobile payment application 123 during personalization of the mobile payment application 123. Accordingly, the encryption keys used to establish the secure channel may include a session key that changes for each session or remote payment transaction. A similar process is described in U.S. patent application Ser. No. 13/075,592, to Aabye et al., filed Mar. 30, 2011, which is hereby incorporated by reference in its entirety.

Further, the encryption key may be a unique derived key (UDK) that is derived from a master key provided by a mobile payment application 123 issuer, a trusted service manager (TSM) associated with a secure element 122, or a secure element issuer. Additionally, any other suitable encryption method may be implemented as one of ordinary skill would recognize. As such, the secure connection may be implemented using data encryption standards such as, e.g., RSA with a key of at least 124 bits, triple data encryption standard (DES), 128-bit advanced encryption standard (AES), an RC4 stream encryption algorithm using minimum 128-bit key length, etc.

After the secure channel has been established, the mobile payment application 123 may generate and send a payment request including encrypted payment information using payment credentials stored in the secure element 122 and a mobile gateway encryption key stored or derived using information stored in the secure element 122 (e.g., a shared encryption key or manner for generating a unique derived key for each session). Accordingly, the mobile gateway may decrypt the encrypted payment information provided by the mobile payment application 123 without affecting the encrypted transaction information that is passed from the merchant server and is encrypted with a payment processing network public key. Therefore, the mobile gateway may use one encryption key for communication over the secure channel and the payment processing network 160 may use a different encryption key for decrypting the encrypted transaction information provided by the merchant computer 130.

Therefore, the mobile payment application 123 may use a first key (e.g., a session key) to generate and securely pass payment credentials and consumer information stored in the secure element 122 of the mobile device 120 and the payment processing network 160 may use a second key (e.g., a payment processing network private key) to decrypt the transaction information passed from the merchant server computer.

Additionally, in some embodiments, a token registry or token vault may be implemented at the payment processing network 160 such that a payment processing network 160 may be capable of de-tokenizing a token received as part of the authentication request to determine an account and a corresponding account issuer for authenticating the remote transaction, as described above. Accordingly, the payment processing network 160 may also be communicatively coupled to or incorporated with a token registry that may include any database or other storage memory where tokens may be issued to a communication device and associated with issuer accounts such that transactions may be processed using tokens instead of primary account numbers/identifiers (PANs).

Additionally, in some embodiments, the remote key manager 140 may include a third party service provider system (e.g., a mobile wallet provider). For example, a third party server provider may include any entity that has an interest or relationship with the consumer 110, mobile device 120, merchant, payment processing network 160, or any other payment transaction processing methods or systems. For example, the third party service provider system may comprise a mobile wallet provider, a mobile device manufacturer, a mobile network operator, or any other entity that may interface with merchants and consumer devices. Accordingly, embodiments of the present invention may allow for a third party service provider system to register merchants and manage authentication processes for merchant remote transactions to provide more secure processing of remote transactions.

Finally, although embodiments focus on remote payment transactions, embodiments are not limited to such transactions and the authentication concepts described herein may be used for many different types of transactions. For example, embodiments may be used to authenticate and authorize provisioning processes, card or account verification/validation processes, and/or any other issuer or other service provider process where authentication may be helpful while using a communication device.

As such, the authentication request and response messages passed through the remote key manager 140 may be used to obtain authentication from a relevant service provider or interested party for any relevant activity. For example, in the case of a user provisioning process, the authentication processes and systems described herein may be used to authenticate a user's know your customer (KYC) information (e.g., social security number, date of birth, zip code, etc.) or any other personal information prior to provisioning an account on a communication device to allow for an issuer to authenticate a consumer 110 or account during the provisioning process. Accordingly, during the provisioning of the account in the mobile device a consumer 110 may enter their user authentication data, personal information, an answer to a challenge question, or any other relevant information along with their account credentials (e.g., PAN, expiration date, etc.) into a remote transaction application 124 in order to initiate the provisioning of the account information on the communication and obtain authorization from an authentication computer 191 associated with an issuer of an account.

Such an authentication and validation process may be accomplished using an account provisioning request which may allow a consumer 110 to request the personalization of a mobile payment application 123 with particular account information associated with an account issuer using the remote key manager 140 in a similar process to that shown above in FIG. 6.

For example, the interaction between the remote transaction application 124, mobile payment application 123, remote key manager 140, payment processing network 160, directory server computer 190, and an authentication computer 191 may be the same as shown in FIG. 6. However, instead of passing encrypted payment information associated with a remote payment transaction, the consumer 110 may enter and pass encrypted personal information and payment credentials associated with the account to allow for the issuer to identify the account, authenticate the consumer 110 as being associated with known information about the consumer 110 (e.g., KYC information for the account holder), and make an authorization decision about the provisioning process, and provide an account provisioning response that allows a provisioning system to initiate the provisioning of the account information.

The account provisioning response may include any information that may be used by a provisioning system to provision an account on the communication device. For example, the account provisioning response may include a provisioning response value (or any other indicator) that provides authorization for a provisioning system to provision the account on the communication device. Additionally, the account provisioning response may include generated account provisioning scripts or other formatted information and/or instructions that can be used to provision the account on a communication device. Accordingly, the provisioning scripts may be transferred to the provisioning system or a trusted service manager associated with the issuer, authentication computer 191, payment processing network 160, communication device, or any other entity in the remote transaction processing system in order to provision the account on the communication device.

Additionally, the account provisioning response may include user authentication data (e.g., PIN, passcode, password, etc.) that may be used during the remote payment transaction processing described above. Accordingly, the authentication infrastructure may be used to establish user authentication data to be used in connection with the payment transactions. In some embodiments, the user authentication data may be returned in an account provisioning response that is sent back through the authentication system shown in steps 613-618 of FIG. 6 above. In some embodiments, the user authentication data may be passed through another channel or through another known communication method (e.g., email, SMS, etc.) that may be outside of the account provisioning response to ensure the consumer 110 obtains the user authentication data through a second or separate communication method. By ensuring the consumer 110 has access to existing communication methods to obtain the user authentication data, system security may be further assured.

Accordingly, in some embodiments, the consumer 110 may enter personal information into the remote transaction application 124, mobile payment application 123, or any other mobile device in order to authenticate themselves during a provisioning request provided to an authentication computer 191 through the remote key manager 140. The mobile application or remote transaction application 124 may pass the personal information along with the account credentials to the mobile payment application 123 which may use a stored encryption key to encrypt the personal information as described above. The mobile payment application 123 may then pass the encrypted personal information to the remote transaction application 124 for sending to the remote key manager 140. The remote key manager 140 may decrypt the personal information and/or account information and initiate an authentication process as described in reference to steps 610-616 of FIG. 6.

For instance, the authentication computer 191 may be identified using the account credentials/information included in the provisioning request and the authentication computer 191 may compare the personal information to registered consumer information associated with the account to validate the consumer 110. For example, a social security number, address, date of birth, or any other information may be provided by the consumer 110 and validated as part of the provisioning request validation. After validating the consumer 110, the authentication computer 191 may generate the script or otherwise return an account provisioning response message that indicates that a provisioning system may provision the account information on the communication device.

Therefore, the advantages provided by embodiments of the present invention may be provided outside of remote payment transactions and may allow for an efficient authentication process for a communication device to interface with an authentication system for any type of authentication process.

III. Exemplary Computer Apparatus

Figure 7:
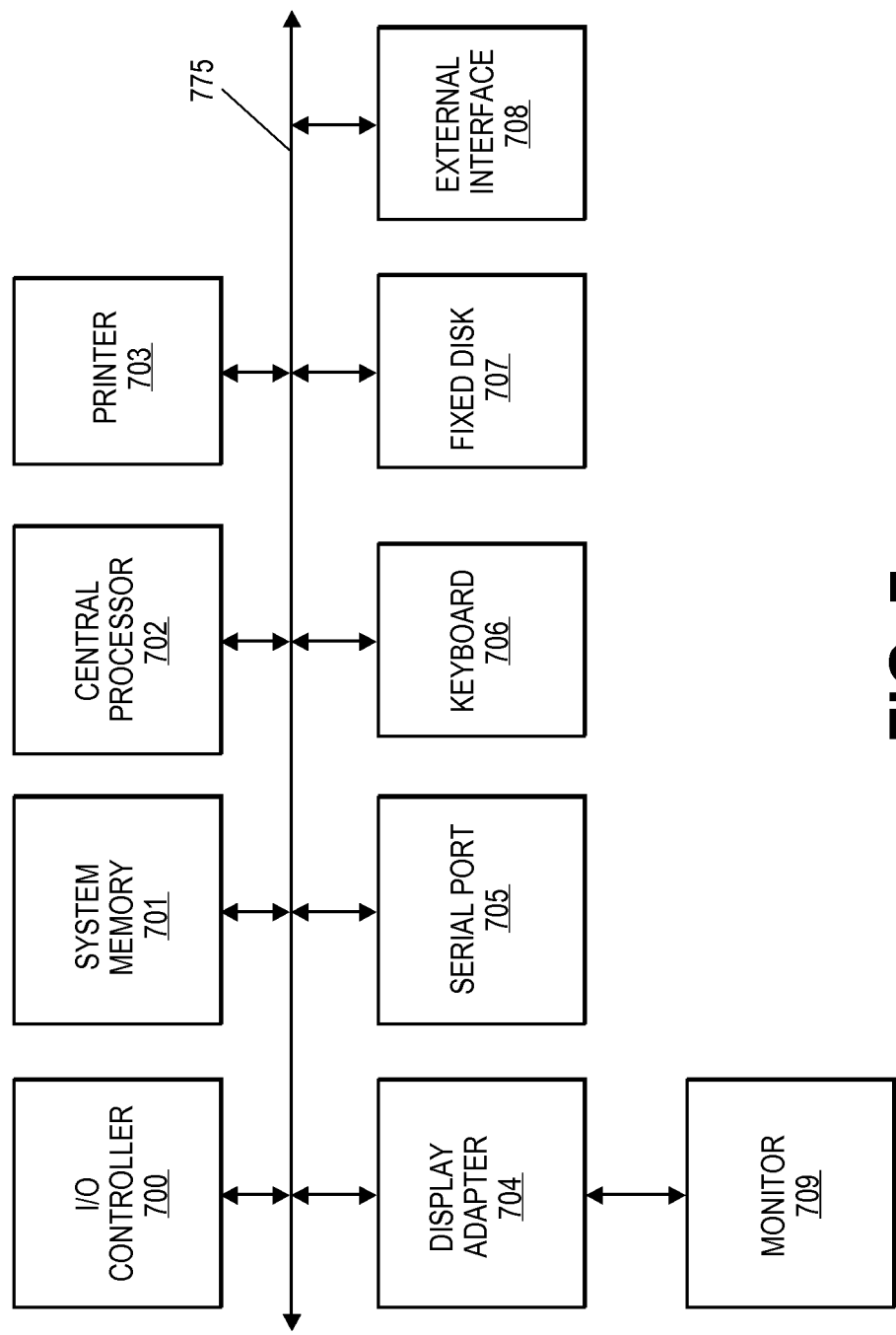
FIG. 7 shows a block diagram of an exemplary computer apparatus.

FIG. 7 is a high level block diagram of a computer system that may be used to implement any of the entities or components described above. The subsystems shown in FIG. 7 are interconnected via a system bus 775. Additional subsystems include a printer 703, keyboard 706, fixed disk 707, and monitor 709, which is coupled to display adapter 704. Peripherals and input/output (I/O) devices, which couple to I/O controller 700, can be connected to the computer system by any number of means known in the art, such as a serial port. For example, serial port 705 or external interface 708 can be used to connect the computer apparatus to a wide area network such as the Internet, a mouse input device, or a scanner. The interconnection via system bus 775 allows the central processor 702 to communicate with each subsystem and to control the execution of instructions from system memory 701 or the fixed disk 707, as well as the exchange of information between subsystems. The system memory 701 and/or the fixed disk may embody a computer-readable medium.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method of processing a remote transaction initiated by a communication device, the method comprising:

receiving, by a server computer, a payment request including encrypted payment information from the communication device, wherein the encrypted payment information is encrypted using a first encryption key, and wherein the encrypted payment information includes security information comprising user authentication data input into the communication device by a user of the communication device and device-specific security values associated with the communication device;

decrypting, by the server computer, the encrypted payment information using a second encryption key;

obtaining, by the server computer, an authentication response value for the remote transaction from an authentication computer associated with an account issuer, wherein the authentication computer validates the security information including the user authentication data and the device-specific security values before providing the authentication response value;

updating, by the server computer, the decrypted payment information to include the authentication response value;

re-encrypting, by the server computer, the decrypted payment information using a third encryption key; and sending, by the server computer, a payment response including the re-encrypted payment information to a transaction processor associated with the communication device, wherein the transaction processor decrypts the re-encrypted payment information using a fourth encryption key and initiates a payment transaction using the decrypted payment information.

2. The method of claim 1, wherein obtaining the authentication response value further comprises:
determining, by the server computer, the authentication computer associated with the decrypted payment information;
sending, by the server computer, an authentication request including the security information to the authentication computer; and
receiving, by the server computer, an authentication response including the authentication response value, the authentication response value indicating validation of the security information by the account issuer associated with account information in the decrypted payment information.

3. The method of claim 1, wherein obtaining the authentication response value further comprises:
sending, by the server computer, an authentication request including the security information to a payment processing network computer associated with the decrypted payment information, wherein the payment processing network computer determines the authentication computer associated with the decrypted payment information and forwards the authentication request to the authentication computer, wherein the authentication computer validates the security information and generates an authentication response including the authentication response value; and
receiving, by the server computer, the authentication response including the authentication response value from the payment processing network computer.

4. The method of claim 2, wherein the authentication computer is operated by a payment processing network on-behalf-of the account issuer.

5. The method of claim 1, wherein the encrypted payment information is generated by a payment application of the communication device by accessing payment credentials stored in a secure memory of the communication device.

6. The method of claim 1, wherein the security information includes a security value generated by a payment application of the communication device.

7. The method of claim 6, wherein the security value is generated using a shared algorithm associated with an account issuer.

8. The method of claim 1, wherein the payment request further comprises a transaction processor certificate, the method further comprising determining the third encryption key using the transaction processor certificate by:
validating that the transaction processor certificate is authentic;
verifying the transaction processor certificate is currently valid with a certificate authority; and
extracting a transaction processor public key from the transaction processor certificate.

9. The method of claim 1, wherein the transaction processor initiates the payment transaction by mapping the decrypted payment information to an authorization request message configured to be processed by a payment processing network.

10. The method of claim 1, wherein the authentication response value is validated by a payment processing network after initiation of the payment transaction during processing of the payment transaction.

11. The method of claim 1, wherein the first encryption key includes a public key of a third party public/private key pair, wherein the third party public/private key pair includes a third party public key and a third party private key, wherein the first encryption key includes the third party public key, and wherein the second encryption key includes the third party private key.

12. The method of claim 11, wherein the server computer, the third party public key, and the third party private key are associated with a payment processing network.

13. A server computer comprising:
a processor; and
a computer-readable medium coupled to the processor, the computer-readable medium comprising code, executable by the processor, to cause the server computer to:
receive a payment request including encrypted payment information from a communication device, wherein the encrypted payment information is encrypted using a first encryption key, and wherein the encrypted payment information includes security information comprises user authentication data input into the communication device by a user of the communication device into the communication device and device-specific security values associated with the communication device;
decrypt the encrypted payment information using a second encryption key;
obtain an authentication response value for a remote transaction from an authentication computer associated with an account issuer, wherein the authentication computer validates the security information including the user authentication data and the device-specific security values before providing the authentication response value;
update the decrypted payment information to include the authentication response value;
re-encrypt the decrypted payment information using a third encryption key; and
send a payment response including the re-encrypted payment information to a transaction processor associated with the communication device, wherein the transaction processor decrypts the re-encrypted payment information using a fourth encryption key and initiates a payment transaction using the decrypted payment information.

14. The server computer of claim 13, wherein obtaining the authentication response value further comprises:
determining, by the server computer, the authentication computer associated with the decrypted payment information;
sending, by the server computer, an authentication request including the security information to the authentication computer; and
receiving, by the server computer, an authentication response including the authentication response value, the authentication response value indicating validation of the security information by the account issuer associated with account information in the decrypted payment information.

15. The server computer of claim 13, wherein obtaining the authentication response value further comprises:
sending, by the server computer, an authentication request including the security information to a payment processing network computer associated with the decrypted payment information, wherein the payment processing network computer determines the authentication computer associated with the decrypted payment information and forwards the authentication request to the authentication computer, wherein the authentication computer validates the security information and generates an authentication response including the authentication response value; and receiving, by the server computer, the authentication response including the authentication response value from the payment processing network computer.

16. The server computer of claim 13, wherein the security information includes a security value generated by a payment application of the communication device.

17. The server computer of claim 13, wherein the authentication response value is validated by a payment processing network after initiation of the payment transaction during processing of the payment transaction.

* * * * *